(12) United States Patent
Uehara et al.

(10) Patent No.: US 8,819,675 B2
(45) Date of Patent: Aug. 26, 2014

(54) VIRTUAL MACHINE MONITOR AND MULTIPROCESSOR SYSTEM

(75) Inventors: Keitaro Uehara, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1444 days.

(21) Appl. No.: 12/222,227

(22) Filed: Aug. 5, 2008

(65) Prior Publication Data

US 2009/0138887 A1   May 28, 2009

(30) Foreign Application Priority Data

Nov. 28, 2007 (JP) ................................. 2007-307626
Jun. 30, 2008 (JP) ................................. 2008-169803

(51) Int. Cl.
*G06F 9/455* (2006.01)
*G06F 9/46* (2006.01)
*G06F 9/50* (2006.01)

(52) U.S. Cl.
CPC ................................... *G06F 9/5077* (2013.01)
USPC ............................................................. 718/1

(58) Field of Classification Search
None
See application file for complete search history.

(56) References Cited

U.S. PATENT DOCUMENTS

| | | | |
|---|---|---|---|
| 6,496,847 B1 | 12/2002 | Bugnion et al. | |
| 7,457,910 B2 * | 11/2008 | Chang et al. | 711/103 |
| 7,673,114 B2 * | 3/2010 | Allen et al. | 711/173 |
| 7,853,772 B2 * | 12/2010 | Chang et al. | 711/173 |
| 7,865,686 B2 | 1/2011 | Akimoto | |
| 8,135,921 B2 * | 3/2012 | Logan et al. | 711/153 |

| | | | |
|---|---|---|---|
| 2002/0161902 A1 | 10/2002 | McMahan et al. | |
| 2003/0163651 A1 | 8/2003 | Jain et al. | |
| 2004/0139287 A1 | 7/2004 | Foster et al. | |

FOREIGN PATENT DOCUMENTS

| | | |
|---|---|---|
| JP | 2001-282560 | 10/2001 |
| JP | 2004-005443 A | 1/2004 |
| JP | 2007-257097 A | 10/2007 |
| WO | WO 2006/117394 A2 | 11/2006 |

OTHER PUBLICATIONS

"Intel® Virtualization Technology for Directed I/O", Intel® Architecture Specification, Revision: 1.1, Order No. D51397-003; Sep. 2007, pp. 1-148.
"Advanced Configuration and Power Interface Specification", Hewlett-Packard/Intel/Microsoft/Phoenix/Toshiba, Revision 3.0, Sep. 2, 2004.
Office Action, issued from Japanese Patent Office, in corresponding to Japanese Patent Application No. 2008-169803, dated Jul. 31, 2012, 3 pages in Japanese with 10 page English translation.
Office Action, issued from Chinese Patent Office, in the corresponding Chinese Patent Application No. 2008102106429, dated Jan. 6, 2010, pp. 1-8.

* cited by examiner

*Primary Examiner* — Corey S Faherty
(74) *Attorney, Agent, or Firm* — Nicholas Trenkle; Stephen J. Weyer, Esq.; Stites & Harbison, PLLC

(57) ABSTRACT

In order to provide an interface of acquiring physical position information of an I/O device on a virtual machine monitor having an exclusive allocation function of the I/O device and optimize allocation of a resource to a virtual server by using the acquired physical position information, a virtual machine monitor includes an interface of allocating a resource in accordance with a given policy (a parameter of determining to which a priority is given in distributing resources) for an I/O device, a CPU NO., and a memory amount request to guest OS. Further, the virtual machine monitor includes an interface of pertinently converting physical position information of the resource allocated by the virtual machine monitor to notice to guest OS.

17 Claims, 51 Drawing Sheets

FIG. 3

PHYSICAL COMPONENT CONSTITUTION TABLE 400

| RESOURCE # 405 | RESOURCE TYPE 410 | RANGE 415 | COMPONENT # 420 | COMPONENT TYPE 425 | POWER CONSUMPTION 435 | |
|---|---|---|---|---|---|---|
| | | | | | RESOURCE 430 | COMPONENT |
| 1 | CPU CORE | CORE #0-1 | 110a | CPU SOCKET | 20 | 80 |
| 2 | CPU CORE | CORE #2-3 | 110b | CPU SOCKET | 20 | 80 |
| 3 | CPU CORE | CORE #4-5 | 110c | CPU SOCKET | 20 | 80 |
| 4 | CPU CORE | CORE #6-7 | 110d | CPU SOCKET | 20 | 80 |
| 5 | MEMORY | DIMM#0-3 0x0_0000_0000-0x0_FFFF_FFFF | 110a | CPU SOCKET | 10 | 80 |
| 6 | MEMORY | DIMM#4-7 0x1_0000_0000-0x1_FFFF_FFFF | 110b | CPU SOCKET | 10 | 80 |
| 7 | MEMORY | DIMM#8-11 0x2_0000_0000-0x2_FFFF_FFFF | 110c | CPU SOCKET | 10 | 80 |
| 8 | MEMORY | DIMM#12-15 0x3_0000_0000-0x3_FFFF_FFFF | 110d | CPU SOCKET | 10 | 80 |
| 9 | I/O SLOT | SLOT #0-3 | 160a | I/O HUB | 5 | 40 |
| 10 | I/O SLOT | SLOT #4-7 | 160b | I/O HUB | 5 | 40 |

FIG. 4

I/O ADAPTOR CONSTITUTION TABLE 450

| I/O ADAPTOR # 455 | I/O ADAPTOR 460 | I/O SLOT # 465 | ADAPTOR TYPE 470 | POWER CONSUMPTION 475 |
|---|---|---|---|---|
| 1 | 180a | SLOT #0 | NIC | 10 |
| 2 | 180b | SLOT #2 | HBA | 20 |
| 3 | 180c | SLOT #3 | HBA | 20 |
| 4 | 180d | SLOT #4 | HBA | 25 |
| 5 | 180e | SLOT #5 | NIC | 10 |
| 6 | 180f | SLOT #7 | NIC | 10 |

FIG. 5

INTERCOMPONENT DISTANCE
CORRESPONDING TABLE
500

| COMPONENT # | COMPONENT TYPE | PAIR COMPONENT # | | | | | |
|---|---|---|---|---|---|---|---|
| | | 110a | 110b | 110c | 110d | 160a | 160b |
| 110a | CPU SOCKET | 0 | 1 | 2 | 1 | 1 | 2 |
| 110b | CPU SOCKET | 1 | 0 | 1 | 2 | 1 | 2 |
| 110c | CPU SOCKET | 2 | 1 | 0 | 1 | 2 | 1 |
| 110d | CPU SOCKET | 1 | 2 | 1 | 0 | 2 | 1 |
| 160a | I/O HUB | 1 | 1 | 2 | 2 | 0 | 3 |
| 160b | I/O HUB | 2 | 2 | 1 | 1 | 3 | 0 |

FIG. 6

PHYSICAL NETWORK CONSTITUTION TABLE 550

| NETWORK # 555 | COMPONENT # (from) 420a | COMPONENT # (to) 420b | BAND 560 | LATENCY 570 |
|---|---|---|---|---|
| 1 | 110a | 110b | 6 | 50 |
| 2 | 110b | 110c | 6 | 50 |
| 3 | 110c | 110d | 6 | 50 |
| 4 | 110d | 110a | 6 | 50 |
| 5 | 110a | 160a | 3 | 50 |
| 6 | 110b | 160a | 3 | 50 |
| 7 | 110c | 160b | 3 | 50 |
| 8 | 110d | 160b | 3 | 50 |

FIG. 7

LOGICAL HW REQUEST I/F
350a

| VIRTUAL SERVER # (351) | GUEST NAME (352) | I/O ADAPTOR (353) | CPU CORE NO. (354) | MEMORY AMOUNT (355) | POLICY (356) | PRIORITY (357) |
|---|---|---|---|---|---|---|
| 1 | GUEST OS1 360a | 180a, 180c | 4 | 4GB | CPU-IO PRIORITY | 5 |

FIG. 8

PHYSICAL-LOGICAL HW ALLOCATION TABLE
310

| VIRTUAL SERVER # (351) | on/off (311) | USED RESOURCE # (313) | | | USED COMPONENT # (315) | USER NETWORK # (316) |
|---|---|---|---|---|---|---|
| | | I/O ADAPTOR (312) | CPU CORE (313) | MEMORY (314) | | |
| 1 | on | #1,3 | #0,1,2,3 | #4,5,6,7 0x1_0000_0000-0x1_FFFF_FFFF | 110a, 110b, 160a | #1,5,6 |

FIG. 10

LOGICAL HW REQUEST I/F 350b

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 2 | 4GB | CPU-MEMORY PRIORITY | 5 |

FIG. 11

LOGICAL HW REQUEST I/F 350c

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 2 | 4GB | IO-MEMORY PRIORITY | 5 |

FIG. 12

PHYSICAL-LOGICAL HW ALLOCATION TABLE 310b

| VIRTUAL SERVER # | on/off | USED RESOURCE # | | | | USED COMPONENT # | USED NETWORK # |
|---|---|---|---|---|---|---|---|
| | | I/O ADAPTOR | CPU CORE | MEMORY | | | |
| 1 | on | #1,3 | #0,1,2,3 | #4,5,6,7 0x1_0000_0000-0x1_FFFF_FFFF | | 110a, 110b, 160a | #1,5,6 |
| 2 | on | #2 | #4,5 | #8,9,10,11 0x2_0000_0000-0x2_FFFF_FFFF | | 110c, 160a | #2,6 |

FIG. 13

PHYSICAL-LOGICAL HW ALLOCATION TABLE 310c

| VIRTUAL SERVER # | on/off | USED RESOURCE # | | | | USED COMPONENT # | USED NETWORK # |
|---|---|---|---|---|---|---|---|
| | | I/O ADAPTOR | CPU CORE | MEMORY | | | |
| 1 | on | #1,3 | #0,1,2,3 | #4,5,6,7 0x1_0000_0000-0x1_FFFF_FFFF | | 110a, 110b, 160a | #1,5,6 |
| 2 | on | #2 | #6,7 | #0,1,2,3 0x0_0000_0000-0x0_FFFF_FFFF | | 110a, 110d, 160a | #4,5 |

FIG. 14

INTERRESOURCE DISTANCE
CALCULATION TABLE
600b

| VIRTUAL SERVER # 351 | CATEGORY 601 | from 602 | to 603 | INTERCOMPONENT DISTANCE 604 | Σ 605 |
|---|---|---|---|---|---|
| 2 | CPU-MEMORY | CORE #4 | DIMM#8,9,10,11 | 0 | 0 |
| | | CORE #5 | DIMM#8,9,10,11 | 0 | |
| | IO-MEMORY | ADAPTOR #2 | DIMM#8,9,10,11 | 2 | 2 |
| | CPU-IO | CORE #4 | ADAPTOR #2 | 2 | 4 |
| | | CORE #5 | ADAPTOR #2 | 2 | |

FIG. 15

INTERRESOURCE DISTANCE CALCULATION TABLE 600c

| VIRTUAL SERVER # | CATEGORY | from | to | INTERCOMPONENT DISTANCE | Σ |
|---|---|---|---|---|---|
| 2 | CPU-MEMORY | CORE #6 | DIMM#0,1,2,3 | 1 | 2 |
| | | CORE #7 | DIMM#0,1,2,3 | 1 | |
| | IO-MEMORY | ADAPTOR #2 | DIMM#0,1,2,3 | 1 | 1 |
| | CPU-IO | CORE #6 | ADAPTOR #2 | 2 | 4 |
| | | CORE #7 | ADAPTOR #2 | 2 | |

FIG. 18

LOGICAL HW REQUEST I/F 350d

| VIRTUAL SERVER # | GUEST NAME | I/O ADAPTOR | CPU CORE NO. | MEMORY AMOUNT | POLICY | PRIORITY |
|---|---|---|---|---|---|---|
| 1 | GUEST OS1 360a | 180a, 180c | 2 | 8GB | CPU-IO PRIORITY | 5 |

FIG. 19

PHYSICAL-LOGICAL HW ALLOCATION TABLE 310d

| VIRTUAL SERVER # | on/off | USED RESOURCE # | | | USED COMPONENT # | USED NETWORK # |
|---|---|---|---|---|---|---|
| | | I/O ADAPTOR | CPU CORE | MEMORY | | |
| 1 | on | #1,3 | #2,3 | #0,1,2,3,4,5,6,7 0x0_0000_0000-0x1_FFFF_FFFF | 110a, 110b, 160a | #1,5,6 |

FIG. 21

LOGICAL HW REQUEST I/F 350e

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 2 | 4GB | CPU-MEMORY PRIORITY | 5 |

FIG. 22

LOGICAL HW REQUEST I/F 350f

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 2 | 4GB | CPU-IO PRIORITY | 5 |

FIG. 23

PHYSICAL-LOGICAL HW ALLOCATION TABLE 310e

| VIRTUAL SERVER # | on/off | USED RESOURCE # | | | USED COMPONENT # | USED NETWORK # |
| --- | --- | --- | --- | --- | --- | --- |
| | | I/O ADAPTOR | CPU CORE | MEMORY | | |
| 1 | on | #1,3 | #2,3 | #0,1,2,3,4,5,6,7<br>0x0_0000_0000-0x1_FFFF_FFFF | 110a, 110b, 160a | #1,5,6 |
| 2 | on | #2 | #4,5 | #8,9,10,11<br>0x2_0000_0000-0x2_FFFF_FFFF | 110c, 160a | #2,6 |

FIG. 24

PHYSICAL-LOGICAL HW ALLOCATION TABLE 310f

| VIRTUAL SERVER # | on/off | USED RESOURCE # | | | USED COMPONENT # | USED NETWORK # |
| --- | --- | --- | --- | --- | --- | --- |
| | | I/O ADAPTOR | CPU CORE | MEMORY | | |
| 1 | on | #1,3 | #2,3 | #0,1,2,3,4,5,6,7<br>0x0_0000_0000-0x1_FFFF_FFFF | 110a, 110b, 160a | #1,5,6 |
| 2 | on | #2 | #0,1 | #12,13,14,15<br>0x3_0000_0000-0x3_FFFF_FFFF | 110a, 110d, 160a | #4,5 |

FIG. 25

INTERRESOURCE DISTANCE
CALCULATION TABLE
600e

| VIRTUAL SERVER # | CATEGORY | from | to | INTERCOMPONENT DISTANCE | Σ |
|---|---|---|---|---|---|
| 2 | CPU-MEMORY | CORE #4 | DIMM#8,9,10,11 | 0 | 0 |
| | | CORE #5 | DIMM#8,9,10,11 | 0 | |
| | IO-MEMORY | ADAPTOR #2 | DIMM#8,9,10,11 | 2 | 2 |
| | CPU-IO | CORE #4 | ADAPTOR #2 | 2 | 4 |
| | | CORE #5 | ADAPTOR #2 | 2 | |

FIG. 26

INTERRESOURCE DISTANCE CALCULATION TABLE 600f

| VIRTUAL SERVER # | CATEGORY | from | to | INTERCOMPONENT DISTANCE | Σ |
|---|---|---|---|---|---|
| 2 | CPU-MEMORY | CORE #0 | DIMM#12,13,14,15 | 1 | 2 |
| | | CORE #1 | DIMM#12,13,14,15 | 1 | |
| | IO-MEMORY | ADAPTOR #2 | DIMM#12,13,14,15 | 2 | 2 |
| | CPU-IO | CORE #0 | ADAPTOR #2 | 1 | 2 |
| | | CORE #1 | ADAPTOR #2 | 1 | |

FIG. 29

LOGICAL HW REQUEST I/F 350g

| VIRTUAL SERVER # | GUEST NAME | I/O ADAPTOR | CPU CORE NO. | MEMORY AMOUNT | POLICY | PRIORITY |
|---|---|---|---|---|---|---|
| 1 | GUEST OS1 360a | 180a, 180c | 1 | 2GB | CPU-MEMORY-IO PRIORITY | 5 |

FIG. 30

PHYSICAL-LOGICAL HW ALLOCATION TABLE 310g

| VIRTUAL SERVER # | on/off | USED RESOURCE # | | | USED COMPONENT # | USED NETWORK # |
|---|---|---|---|---|---|---|
| | | I/O ADAPTOR | CPU CORE | MEMORY | | |
| 1 | on | #1,3 | #0 | #0,1 0x0_0000_0000-0x0_7FFF_FFFF | 110a, 160a | #5 |

FIG. 32

LOGICAL HW REQUEST I/F 350h

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 1 | 2GB | RELIABILITY PRIORITY | 5 |

FIG. 33

LOGICAL HW REQUEST I/F 350i

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 1 | 2GB | BAND PRIORITY | 5 |

FIG. 34

LOGICAL HW REQUEST I/F 350j

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180b | 1 | 2GB | POWER CONSERVATION PRIORITY | 5 |

FIG. 35

PHYSICAL-LOGICAL HW ALLOCATION TABLE 310h

| VIRTUAL SERVER # | on/off | USED RESOURCE # | | | USED COMPONENT # | USED NETWORK # |
|---|---|---|---|---|---|---|
| | | I/O ADAPTOR | CPU CORE | MEMORY | | |
| 1 | on | #1,3 | #0 | #0,1 0x0_0000_0000-0x0_7FFF_FFFF | 110a, 160a | #5 |
| 2 | on | #2 | #2 | #4,5 0x1_0000_0000-0x1_7FFF_FFFF | 110c, 160a | #6 |

FIG. 36

PHYSICAL-LOGICAL HW ALLOCATION TABLE 310i

| VIRTUAL SERVER # | on/off | USED RESOURCE # | | | USED COMPONENT # | USED NETWORK # |
|---|---|---|---|---|---|---|
| | | I/O ADAPTOR | CPU CORE | MEMORY | | |
| 1 | on | #1,3 | #0 | #0,1 0x0_0000_0000-0x0_7FFF_FFFF | 110a, 160a | #5 |
| 2 | on | #2 | #1 | #2,3 0x0_8000_0000-0x0_FFFF_FFFF | 110a, 160a | #5 |

FIG. 37

COMPONENT NETWORK ALLOCATION TABLE 650h

| VIRTUAL SERVER # | SHARING COMPONENT # | SHARING NETWORK # | NETWORK # | SHARING NO. | EFFECTIVE BAND |
|---|---|---|---|---|---|
| 351 | 651 | 652 | 653 | 654 | 655 |
| 1 | 160a | φ | #5 | 1 | 3 |
| 2 | 160a | φ | #6 | 1 | 3 |

FIG. 38

COMPONENT·NETWORK ALLOCATION TABLE 650i

| VIRTUAL SERVER # | SHARING COMPONENT # | SHARING NETWORK # | NETWORK # | SHARING NO. | EFFECTIVE BAND |
|---|---|---|---|---|---|
| 1 | 110a, 160a | #5 | #5 | 2 | 1.5 |
| 2 | 110a, 160a | #5 | #5 | 2 | 1.5 |

FIG. 39

ALLOCATED RESOURCE POWER
CONSUMPTION CALCULATION TABLE 700h

| CATEGORY 701 | RESOURCE TYPE/ COMPONENT TYPE 702 | USED RESOURCE/ COMPONENT # 703 | POWER CONSUMPTION 704 | Σ 705 |
|---|---|---|---|---|
| RESOURCE | CPU CORE | CORE #0 | 20 | 345 |
| | CPU CORE | CORE #2 | 20 | |
| | MEMORY | DIMM#0 | 10 | |
| | MEMORY | DIMM#1 | 10 | |
| | MEMORY | DIMM#4 | 10 | |
| | MEMORY | DIMM#5 | 10 | |
| | I/O SLOT | I/O SLOT #0 | 5 | |
| | I/O SLOT | I/O SLOT #2 | 5 | |
| | I/O SLOT | I/O SLOT #3 | 5 | |
| | I/O ADAPTOR | 180a | 10 | |
| | I/O ADAPTOR | 180b | 20 | |
| | I/O ADAPTOR | 180c | 20 | |
| COMPONENT | CPU SOCKET | 110a | 80 | |
| | CPU SOCKET | 110b | 80 | |
| | IO HUB | 160a | 40 | |

FIG. 40

ALLOCATED RESOURCE POWER
CONSUMPTION CALCULATION TABLE
700i

| CATEGORY | RESOURCE TYPE/ COMPONENT TYPE | USED RESOURCE/ COMPONENT # | POWER CONSUMPTION | Σ |
|---|---|---|---|---|
| RESOURCE | CPU CORE | CORE #0 | 20 | 265 |
| | CPU CORE | CORE #1 | 20 | |
| | MEMORY | DIMM#0 | 10 | |
| | MEMORY | DIMM#1 | 10 | |
| | MEMORY | DIMM#2 | 10 | |
| | MEMORY | DIMM#3 | 10 | |
| | I/O SLOT | I/O SLOT #0 | 5 | |
| | I/O SLOT | I/O SLOT #2 | 5 | |
| | I/O SLOT | I/O SLOT #3 | 5 | |
| | I/O ADAPTOR | 180a | 10 | |
| | I/O ADAPTOR | 180b | 20 | |
| | I/O ADAPTOR | 180c | 20 | |
| COMPONENT | CPU SOCKET | 110a | 80 | |
| | IO HUB | 160a | 40 | |

FIG. 43

LOGICAL HW REQUEST I/F 350k

| VIRTUAL SERVER # | GUEST NAME | I/O ADAPTOR | CPU CORE NO. | MEMORY AMOUNT | POLICY | PRIORITY |
|---|---|---|---|---|---|---|
| 1 | GUEST OS1 360a | 180d, 180f | 4 | 8GB | CPU-MEMORY PRIORITY | 5 |

FIG. 44

PHYSICAL-LOGICAL HW ALLOCATING TABLE 310k

| VIRTUAL SERVER # | on/off | USED RESOURCE # | | | USED COMPONENT # | USED NETWORK # |
|---|---|---|---|---|---|---|
| | | I/O ADAPTOR | CPU CORE | MEMORY | | |
| 1 | on | #4,6 | #4,5,6,7 | #8,9,10,11,12,13,14,15 0x2_0000_0000-0x3_FFFF_FFFF | 110c, 110d, 160b | #3,7,8 |
| | | | | | | |

FIG. 46

PHYSICAL HW CONSTITUTION INFORMATION 750

| HOST CPU CORE # 751 | HOST PHYSICAL ADDRESS BASE 752 | HOST PHYSICAL ADDRESS RANGE 753 |
|---|---|---|
| #4,5 | 0x2_0000_0000 | 4GB |
| #6,7 | 0x3_0000_0000 | 4GB |

FIG. 47

LOGICAL HW CONSTITUTION INFORMATION NOTICE I/F 340

| GUEST CPU CORE # 341 | GUEST PHYSICAL ADDRESS BASE 342 | GUEST PHYSICAL ADDRESS RANGE 343 |
|---|---|---|
| #0,1 | 0x0_0000_0000 | 4GB |
| #2,3 | 0x1_0000_0000 | 4GB |

FIG. 49

LOGICAL HW REQUEST I/F 350m

| VIRTUAL SERVER # | GUEST NAME | I/O ADAPTOR | CPU CORE NO. | MEMORY AMOUNT | POLICY | PRIORITY |
|---|---|---|---|---|---|---|
| 2 | GUEST OS2 360b | 180e | 2 | 4GB | IO-MEMORY PRIORITY | 10 |

PHYSICAL-LOGICAL HW ALLOCATION TABLE 310m

| VIRTUAL SERVER # | on/off | USED RESOURCE # | | | USED COMPONENT # | USED NETWORK # |
|---|---|---|---|---|---|---|
| | | I/O ADAPTOR | CPU CORE | MEMORY | | |
| 1 | on | #4,6 | #4,5,6,7 | #8,9,10,11,12,13,14,15 0x2_0000_0000-0x3_FFFF_FFFF | 110c, 110d, 160b | #3,7,8 |
| 2 | on | #5 | #2,3 | #4,5,6,7 0x1_0000_0000-0x1_FFFF_FFFF | 110b, 160b | #2,8 |

FIG. 51

PHYSICAL-LOGICAL HW ALLOCATION TABLE 310n

| VIRTUAL SERVER # | on/off | USED RESOURCE # | | | | USED COMPONENT # | USED NETWORK # |
|---|---|---|---|---|---|---|---|
| | | I/O ADAPTOR | CPU CORE | MEMORY | | | |
| 1 | on | #4,6 | #2,3,4,5 | #4,5,6,7,8,9,10,11 0x1_0000_0000-0x2_FFFF_FFFF | | 110b,110c,160b | #2,7 |
| 2 | on | #5 | #6,7 | #12,13,14,15 0x3_0000_0000-0x3_FFFF_FFFF | | 110d, 160b | #8 |

FIG. 52

INTERRESOURCE DISTANCE
CALCULATION TABLE
600m

| VIRTUAL SERVER # | CATEGORY | from | to | INTERCOMPONENT DISTANCE | Σ |
|---|---|---|---|---|---|
| 2 | CPU-MEMORY | CORE #2 | DIMM#4,5,6,7 | 0 | 0 |
| | | CORE #3 | DIMM#4,5,6,7 | 0 | |
| | IO-MEMORY | ADAPTOR #5 | DIMM#4,5,6,7 | 2 | 2 |
| | CPU-IO | CORE #4 | ADAPTOR #2 | 2 | 4 |
| | | CORE #5 | ADAPTOR #2 | 2 | |

FIG. 53

INTERRESOURCE DISTANCE
CALCULATION TABLE
600n

| VIRTUAL SERVER # | CATEGORY | from | to | INTERCOMPONENT DISTANCE | Σ |
|---|---|---|---|---|---|
| 2 | CPU-MEMORY | CORE #6 | DIMM#12,13,14,15 | 0 | 0 |
| | | CORE #7 | DIMM#12,13,14,15 | 0 | |
| | IO-MEMORY | ADAPTOR #5 | DIMM#12,13,14,15 | 1 | 1 |
| | CPU-IO | CORE #6 | ADAPTOR #5 | 1 | 2 |
| | | CORE #7 | ADAPTOR #5 | 1 | |

VIRTUAL MACHINE MONITOR AND MULTIPROCESSOR SYSTEM

CLAIM OF PRIORITY

The present application claims priority from Japanese patent application JP 2007-307626 filed on Nov. 28, 2007, and JP 2008-169803 filed on Jun. 30, 2008, the contents of which are hereby incorporated by reference into this application.

FIELD

The present invention relates to an improvement in a virtual computer operating a virtual server on a physical computer by a virtual machine monitor and allocating an I/O device to the virtual server.

BACKGROUND

With a progress of a semiconductor technology in recent years, a multicore processor integrating a plurality of cores on one die, or a memory controller integrated processor mounting a memory controller on a processor die has appeared. In order to effectively utilize computer resources integrated in this way, a movement of reducing cost by integrating processings dispersed to a plurality of servers in a background art to one server is frequently observed. Means which becomes effective in integrating servers in this way is a method of operating a plurality of operating systems on one piece of server by server division. In server division, there are a physical division system of supporting division by hardware by a node unit, or a component unit of a processor (core) or I/O device, and a logical division system realized by a firmware referred to as a hypervisor or virtual machine monitor.

According to the logical division system, respective operating systems (guest OS) are executed on a logical processor provided by a virtual machine monitor, and by mapping a plurality of logical processors to a physical processor by the virtual machine monitor, a section can be divided to a unit finer than a node. Further, with regard to the processor (core), the respective operating systems can also be executed while switching one physical processor (core) among a plurality of logical sections by time sharing. Thereby, a number of logical sections the number of which is larger than the number of the physical processors (cores) can be formed to simultaneously be executed. As virtual machine monitor software constituting an object by logical division, a technology described in U.S. Pat. No. 6,496,847 is representative.

However, in comparison with a processor or a memory in which highly integrated formation is comparatively easy, with regard to I/O device which is essentially difficult to be integrated since it is necessary to provide a port (path) of input/output, a number thereof cannot be reduced and a tendency of deteriorating a balance between CPU and I/O device of the background art is observed. In order to increase a number of I/O devices, a countermeasure of increasing slots by using I/O switches is conceivable. However, by increasing a distance between a processor or a memory and I/O device by I/O switch, there is brought about a case in which I/O function cannot sufficiently be extracted.

Hence, approach of ensuring a sufficient I/O function by making I/O device shared by a plurality of virtual servers in the background art exclusive for a specific virtual server has been adopted. As a function of supporting to make I/O device exclusive by virtual server in this way, VT-d established by Intel corp. or the like is known as disclosed in Intel Virtualization Technology for Directed I/O Architecture Specification [online], Intel Corp., searched on Aug. 24, 2007, internet ftp://download.intel.com/techynology/computing/vptech/Intel (r)_VT_for_Direct_IO.pdf>.

On the other hand, by progress of multicore formation or an appearance of a processor integrated with a memory controller, there is a tendency that an arrangement of resources of processors, memories, I/O devices becomes unbalanced. In order to ensure a function and reliability on such an unbalanced system, a distribution of resources using physical position information is needed. According to OS of the background art, there is a device referred to as Affinity control of corresponding specific processor and memory and in order to support the control, as a standard interface for acquiring physical position information, ACPI (Advanced Configuration and Power Interface) is rectified (Advanced Configuration and Power Interface Specification Revision 3.0, [online], Hewlett-Packard, Intel, Microsoft, Phoenix, and Toshiba, searched on Aug. 24, 2007, internet <http://www.acpi.info/>. According to the affinity control, resource are allocated by relating which CPU and memory OS or application uses.

SUMMARY

However, according to OS of the background art as described above, position information of processor and memory can be controlled by using the device of ACPI. However, I/O device is a resource commonly referred to from all applications, and therefore, a concept of the affinity control using the physical position information of I/O device is not present. Actually, in System Resource Affinity Table (SRAT) or System Locality Distance Information Table (SLIT) rectified in SCPI, only the physical information of processor and memory constitutes an object and physical position information of I/O device is out of the object.

On the other hand, when I/O device is allocated to be exclusive for a specific virtual server by using a virtual machine monitor, the physical position information of I/O device becomes a parameter important for ensuring function or reliability of the virtual server. However, in the ACPI base interface of the background art, there is not means for acquiring the physical position information of I/O.

Further, even when the virtual machine monitor assumedly allocates a pertinent resource to the virtual server, in a case in which guest OS on the virtual server cannot correctly utilize the physical position information, the Affinity control of guest OS is not correctly operated, as a result, there poses a problem that the function or the reliability equivalent to that of the physical server cannot be ensured.

It is an object of the invention to provide an interface acquiring physical position information of I/O device on a virtual machine monitor having an exclusive allocation function of I/O device and optimize allocation of a resource to a virtual server by using the acquired physical position information in accordance with a designated policy. Further, it is an object thereof to provide an interface of pertinently converting physical position information acquired by a virtual machine monitor to notice to a virtual server and making an affinity control similar to that when guest OS is executed on a physical server executable also for guest OS on a virtual server.

The invention is a multiprocessor system comprising a virtual machine monitor for connecting one or more processors, one or more memories, and one or more I/O devices by an internal network and allocating the processor, the memory, and the I/O device to a virtual server, wherein the virtual machine monitor comprises a physical hardware information acquiring portion for acquiring constitution information of a hardware including physical position information of the hardware including the processor, the memory, the I/O device, and the network of the multiprocessor system, a receiving portion for receiving a forming request including a number of the processors, an amount of the memory and the I/O device of the formed virtual server and a policy of allocating a resource, and an allocation processing portion for allocating the processor and the memory to the virtual server to satisfy the allocation policy after allocating the I/O device to the virtual server based on the received forming request.

Further, the virtual machine monitor further comprises a noticing portion for noticing physical position information of the processor, the memory, and the I/O device allocated to the virtual server to the virtual server.

Therefore, the invention can optimize to allocate the resource to the virtual server in accordance with the policy of allocating the resource designated by the forming request by acquiring the physical position information of the I/O device and using the acquired physical position information.

Further, by noticing the physical position information of the resource allocated by the virtual machine monitor to the virtual server, a control similar to that on a physical server can be realized on the virtual server.

BRIEF DESCRIPTION OF THE DRAWINGS

FIG. 3 is an explanatory view showing a physical component constitution table showing the first embodiment;

FIG. 4 is an explanatory view showing a constitution of an I/O adapter constitution table showing the first embodiment;

FIG. 5 is an explanatory view showing a constitution of an intercomponent distance corresponding table showing the first embodiment;

FIG. 6 is an explanatory view showing a constitution of a physical network constitution table showing the first embodiment;

FIG. 7 is a an explanatory view showing a constitution of a logical hardware request I/F of a virtual server 1 showing the first embodiment;

FIG. 8 is an explanatory view showing a physical-logical hardware allocation table of the virtual server 1 showing the first embodiment;

FIG. 10 is an explanatory view showing a logical hardware request I/F of a virtual server 2 constituting a policy by CPU-memory priority showing the first embodiment;

FIG. 11 is an explanatory view showing a constitution of a logical hardware request I/F of the virtual server 2 constituting a policy by I/O-memory priority showing the first embodiment;

FIG. 12 is an explanatory view showing a constitution of a physical-logical hardware allocation table of the virtual server 2 constituting a policy by CPU-memory priority showing the first embodiment;

FIG. 13 is an explanatory view showing a constitution of a logical hardware request I/F of the virtual server 2 constituting a policy by I/O-memory priority showing the first embodiment;

FIG. 14 is an explanatory view showing a constitution of an interresource distance calculation table of the virtual server 2 constituting a policy by CPU-memory priority showing the first embodiment;

FIG. 15 is an explanatory view showing a constitution of an interresource distance calculation table of the virtual server 2 constituting a policy by I/O memory priority showing the first embodiment;

FIG. 18 is an explanatory view showing a constitution of a logical hardware request I/F showing a first modification;

FIG. 19 is an explanatory view showing a physical-logical hardware allocation table showing the first modification;

FIG. 21 is an explanatory view showing a constitution of a logical hardware request I/F of virtual server 2 constituting a policy by CPU-memory priority showing the first modification;

FIG. 22 is an explanatory view showing a constitution of a logical hardware request I/F of the virtual server 2 constituting a policy by CPU-I/O priority showing the first modification;

FIG. 23 is an explanatory view showing a constitution of a physical-logical allocation table of the virtual server 2 constituting a policy by CPU-memory priority showing the first modification;

FIG. 24 is an explanatory view showing a constitution of a physical-logical hardware allocation table of the virtual server 2 constituting a policy by CPU-I/O priority showing the first modification;

FIG. 25 is an explanatory view showing a constitution of an interresource distance calculation table of the virtual server 2 constituting a policy by CPU-memory priority showing the first modification;

FIG. 26 is an explanatory view showing a constitution of an interresource distance calculation table of the virtual server 2 constituting a policy by CPU-I/O priority showing the first modification;

FIG. 29 is an explanatory view showing a constitution of a logical hardware request I/F of the virtual server 1 showing a second modification;

FIG. 30 is an explanatory view showing a constitution of a physical-logical hardware allocation table of the virtual server 1 showing the second modification;

FIG. 32 is an explanatory view showing a constitution of a logical hardware request I/F of the virtual server 2 constituting a policy by reliability priority showing the second modification;

FIG. 33 is an explanatory view showing a constitution of a logical hardware request I/F of virtual server 2 constituting a policy by band priority showing the second modification;

FIG. 34 is an explanatory view showing a logical hardware request I/F of the virtual server 2 constituting a policy by power conservation priority showing the second modification;

FIG. 35 is an explanatory view showing a constitution of a physical-logical hardware allocation table of the virtual servers 1 and 2 constituting a policy by reliability priority showing the second modification;

FIG. 36 is an explanatory view showing a physical-logical hardware allocation table of the virtual servers 1 and 2 constituting a policy by band priority showing the second modification;

FIG. 37 is an explanatory view showing a constitution of a component-network allocation table of the virtual servers 1 and 2 constituting a policy by reliability priority showing the second modification;

FIG. 38 is an explanatory view showing a component network allocation table of the virtual servers 1 and 2 constituting a policy by band priority showing the second modification;

FIG. 39 is an explanatory view showing a constitution of an allocation resource power consumption calculation table when a policy is constituted by reliability priority showing the second modification;

FIG. 40 is an explanatory view showing a constitution of a component network allocation table when a policy is constituted by power consumption priority showing the second modification;

FIG. 43 is an explanatory view showing a constitution of a logical hardware request I/F of the virtual server 1 sowing a second embodiment;

FIG. 44 is an explanatory view showing a constitution of a physical-logical hardware allocation table of the virtual server 1 showing the second embodiment;

FIG. 46 is an explanatory view showing a constitution of physical hardware constitution information showing the second embodiment;

FIG. 47 is an explanatory view showing a constitution of a logical hardware constitution information notice I/F showing the second embodiment;

FIG. 49 is an explanatory view showing a constitution of a logical hardware request I/F of the virtual server 2 showing a third embodiment;

FIG. 50 is an explanatory view showing a constitution of a physical-logical hardware allocation table of the virtual servers 1 and 2 showing the second embodiment;

FIG. 51 is an explanatory view showing other constitution of the physical-logical hardware allocation table of the virtual servers 1 and 2 showing the second embodiment;

FIG. 52 is an explanatory view showing a constitution of a resource power consumption calculation table of the virtual server 2 showing the second embodiment;

FIG. 53 is an explanatory view showing other constitution of the resource power consumption calculation table of the virtual server 2 showing the second embodiment;

DETAILED DESCRIPTION OF THE PREFERRED EMBODIMENTS

An embodiment of the invention will be explained in reference to the attached drawings as follows.

Figure 1:
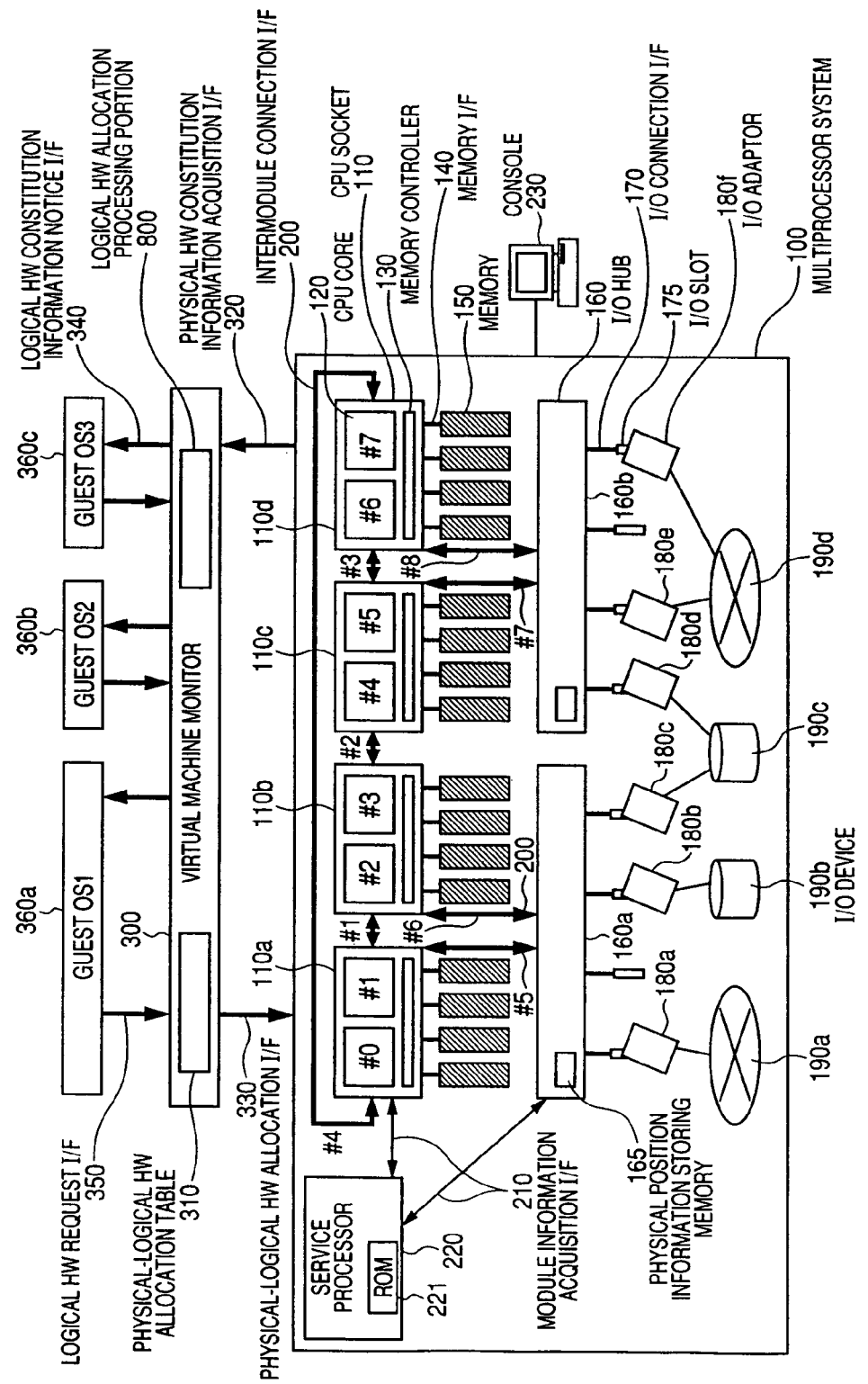
FIG. 1 is a block diagram showing a constitution of a multiprocessor system and a virtual machine monitor to which the invention is applied showing a first embodiment.

FIG. 1 is a block diagram showing a relationship among a multiprocessor system (computer) to which the invention is applied, and a virtual machine monitor and guest OS operated thereon showing a first embodiment.

A multiprocessor system 100 adopts a constitution of connecting one or more CPU sockets (processor package) 110, a memory controller 130, I/O hubs 160a, 160b by intermodule connection I/F (interface) 200. Further, intermodule connection I/F 200 constitutes an internal network of the multiprocessor system 100. Here, it is not necessarily needed that intermodule connection I/F 200 between CPU socket 110 and memory controller 130, between CPU socket 110 and I/O hub socket 160a, 160b, between memory controller 130 and I/O hub socket 160a, 160b are constituted by the same I/F. The following explanation does not differ even when these are constituted by different I/F. Further, I/O hub 160a, 160b are generally referred to as I/O hub 160. Further, a chip set mounted with a function of memory controller 130 or I/O hub 160 may be present. Further, as shown by FIG. 1, a constitution mounted with the memory controller 130 on CPU socket 110 may be constructed. CPU socket 110 includes one or more CPU cores (processor cores) 120. The memory controller 130 is connected to one or more DIMMs (Dual Inline Memory Modules) 150 by way of I/F 140. The I/O hub 160 is mounted with one or more I/F adaptors 180a through 180f via I/O connection I/F 170 and connected with I/O device 190*d* frontward the I/O adaptors 180*a* through 180*f*. Further, I/O bridges or I/O switches may be present frontward from I/O connection I/F 170 to constitute multistages of I/O. Further, I/O adaptors 180*a* through 180*f* are constituted by NIC, HBA (Host Bus Adapter) or the like, which are generally referred to as I/O adaptor 180.

One or more service processors 220 are present on the multiprocessor system 100 for collecting physical position information or connection information of the respective modules (physical constituent elements) via module information acquisition I/F 210. The service processor 220 may be mounted in the form of being outwardly attached as an option of the multiprocessor system 100 or may be in a mode of being mounted as one of I/O devices. Further, the function of the service processor 220 may be present on other computer connected by LAN or the like. Further, I/O device is constituted by an apparatus of inputting/outputting data.

On the multiprocessor system 100, virtual machine monitor 300 is executed and resources on the multiprocessor system 100 are divided to one or more virtual servers to be provided to guests OS 360*a* through 360*c*. Virtual machine monitor 300 receives physical constitution information and connection information of modules collected by the service processor 220 via physical hardware constitution information acquisition interface 320. Further, guests OS 360*a* through 360*c* are generally referred to as guest OS 360.

Guest OS 360 notices resources necessary as virtual servers to virtual machine monitor 300 by logical hardware request I/F 360. Further, in starting guest OS 360 (that is, in starting virtual server), a controller of the multiprocessor system 100 notices logical hardware request I/F 310 set by console 230 to virtual machine monitor 300. Virtual machine monitor 300 acquires information of necessary physical resources via physical-logical hardware allocation interface 330 in reference to a physical-logical hardware allocation table 310 or the like present on virtual machine monitor 300 after taking a resource allocation policy included in logical hardware request I/F 350 into consideration. Virtual machine monitor 300 includes a logical hardware allocation processing portion 801 for allocating physical resources as logical hardware based on acquired information of physical resources and logical hardware request I/F 310. Information of physical resources allocated by virtual machine 300 is converted into logical hardware constitution information by virtual machine monitor 300 and noticed to guest OS 360 via logical hardware constitution information notice I/F 340.

Further, the multiprocessor system 100 is connected with the console 230 including an input apparatus and an output apparatus and used by the controller for giving instruction to virtual machine monitor 300 or the service processor 220 and receiving a result of a processing from virtual machine monitor 300 or the service processor 220 to display on the output apparatus.

<Constitution of Multiprocessor System>

A constitution of the multiprocessor system 100 according to the first embodiment will be explained further in details. Four CPU sockets 110*a* through 110*d* are connected in a ring-like shape by intermodule connection I/F 200. Respective CPU sockets 110 are provided with twos of CPU cores 120 and there are 8 of CPU cores 120 in a total of the multiprocessor system 100. In the following explanation, there is a case in which consecutive numbers of 8 of CPU cores from the left in the drawing are referred to as #0 through #7.

Memory controllers 130 on the respective CPU sockets 110 include respective 4 pieces of memory I/F 140 and connected with respective 4 of DIMM (memory) 150. Here, in order to simplify the following explanation, assume that each DIMM 150 is of 1 GB, or 4 GB, a total of the multiprocessor system is mounted with memories of 16 GB. In the following explanation, there is a case in which consecutive numbers of 16 sheets of DIMM 150 are referred as DIMM #0 through #15 from the left in the drawing.

I/O hub 160 is constituted by two I/O hubs 160*a* and 160*b*, provided with respective twos of intermodule connection I/F 200, I/O hub 160*a* connects to CPU sockets 110*a* and 110*b*, and I/O hub 160*b* connects CPU sockets 110*c* and 110*d*, respectively. I/O hub 160 is provided with respective fours of I/O connection I/F 170, provided with I/O slots 175 frontward from I/O connection I/F 170, and connected with I/O adaptors 180.

There are 8 of I/O slots 175 in a total of the multiprocessor system 100, and when consecutive numbers of the I/O slots 175 are defined as #0 through 7 from the left of the drawing, I/O adaptor 180*a* is connected to I/O slot #0, I/O adaptor 180*b* is connected to I/O slot #2, I/O adaptor 180*c* is connected to I/O slot #3, I/O adaptor 180*d* is connected to I/O slot #4, I/O slot 180*e* is connected to I/O slot #5, and I/O adaptor 180*f* is connected to I/O slot #7, respectively. In this example, nothing is connected to I/O slot #1 and I/O slot #6.

Figure 64:
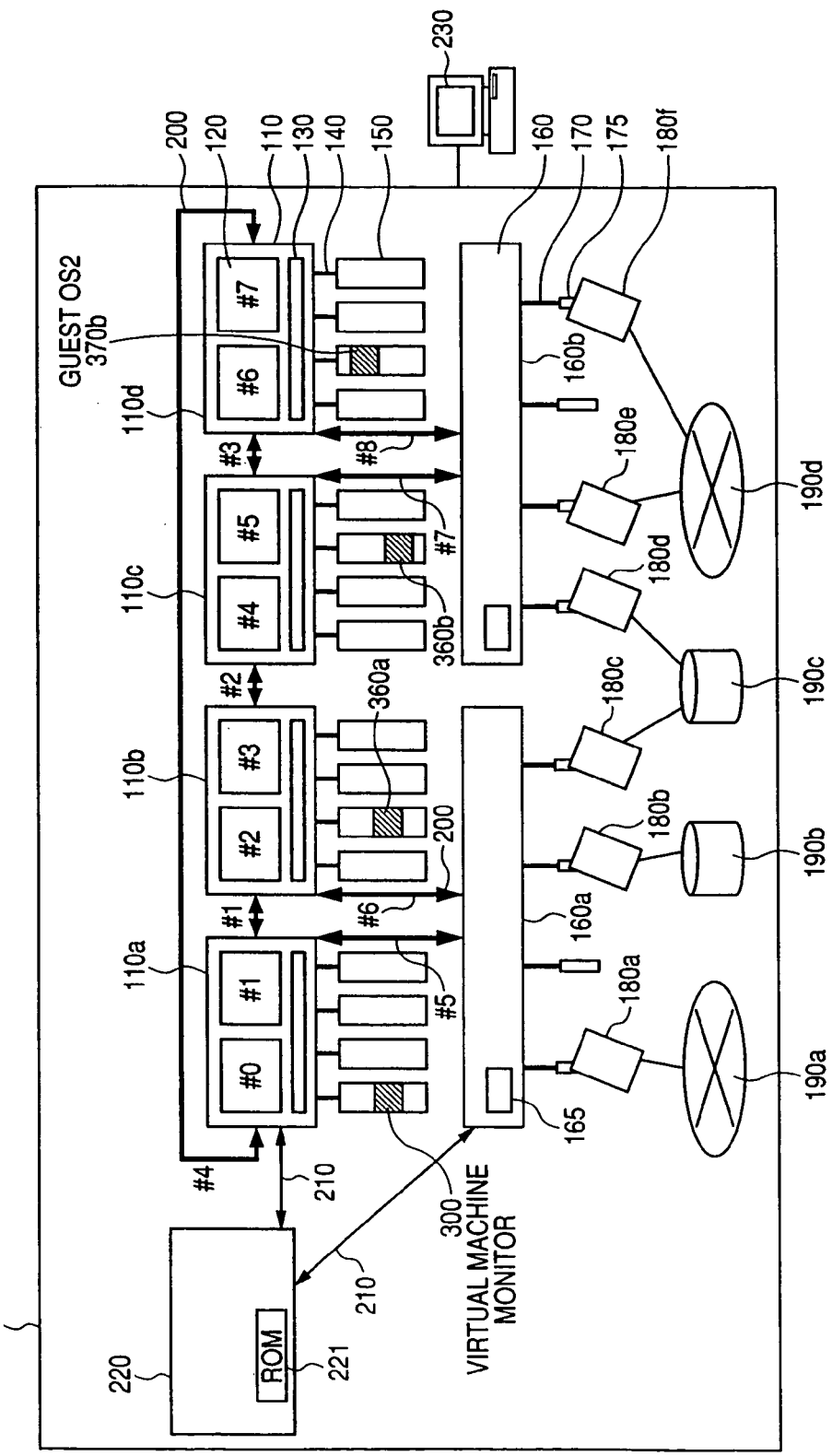
FIG. 64 is a constitution view of a multiprocessor system showing the first embodiment.

FIG. 64 is a constitution view showing a behavior of executing virtual machine monitor 300, guest OS1 360*a*, guest OS2 360*b*, guest OS3 360*c* on multiprocessor system 100 in correspondence with the constitution of FIG. 1. A program of virtual machine monitor 300 is present on any of I/O device 190, or on ROM 201 of service processor 200, developed onto memory 150 (in this example, memory 150#0) from the storing location in starting the multiprocessor system 300, and executed on any of virtual machine CPU core 120. CPU core 120 executing virtual machine monitor 300 may be fixed, or executing CPU core may be variable in accordance with a state of operating CPU core such that, for example, CPU core which is not operated at that occasion or CPU core having a small processing load is executed.

According to guest OS 360, a program is present on any of I/O device 190 allocated to logical server 370 divided by virtual machine monitor 300, guest OS 360 is developed onto memory 150 allocated to logical server 370 in starting logical server 370 and executed by CPU core 300 allocated to logical server 370. In the example of FIG. 64, guest OS1 360*a* is developed onto memory 150#5, guest OS2 360*b* is developed onto memory 150#10, guest OS3 360*c* is developed onto memory 150#13 and executed. Further, although in the example, an example of arranging guest OS1 360 on one memory module is shown to facilitate to understand, depending on size of guest OS or setting of memory interleave, guest OS can dispersedly be arranged on a plurality of memory modules.

Figure 2:
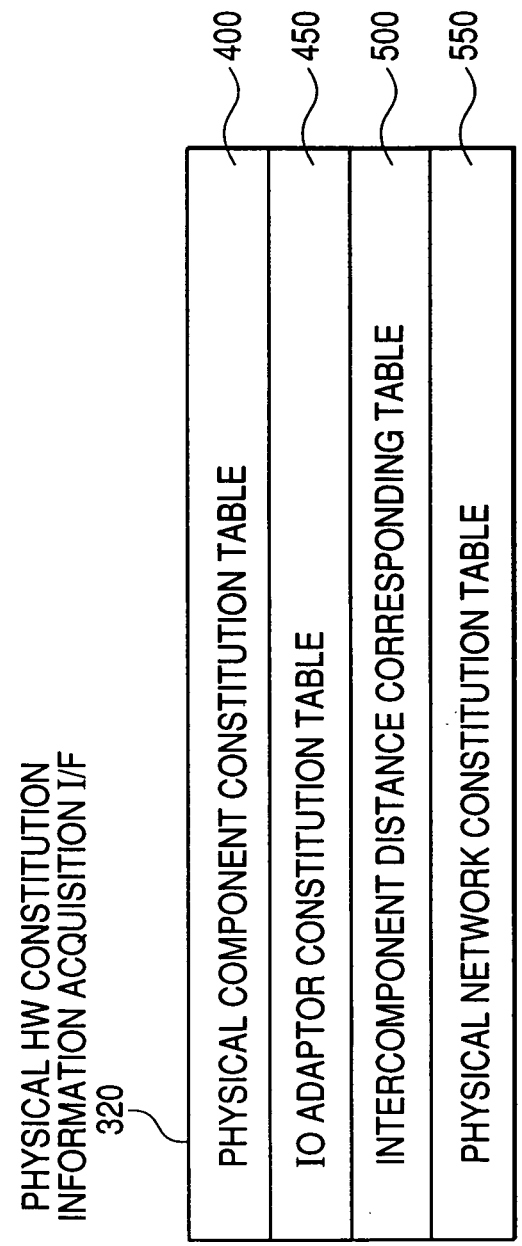
FIG. 2 is an explanatory view showing a constitution of a physical hardware constitution information acquisition I/F showing the first embodiment.

FIG. 2 through FIG. 6 show physical hardware constitution information acquisition I/F 320 of the multiprocessor system 100 which virtual machine monitor 300 acquires via service processor 220. FIG. 2 shows items of physical hardware constitution information acquisition I/F 320. The physical hardware constitution information acquisition I/F 320 is constituted by 4 types of tables (tables) of a physical constitution table 400, an I/O adapter constitution table 450, an intercomponent distance corresponding table 500, and a physical network constitution table 550. The tables are formed (or updated) by virtual machine monitor 300 by inquiring information of hardware resources collected by service processor 220 via module information acquisition I/F 210 at a predetermined period or a predetermined timing. The physical hardware constitution information acquisition I/F 320 set by virtual machine monitor 300 is stored to physical position information storing memory 165 for I/O hub 160 or the memory 150 shown in FIG. 1.

FIG. 3 shows a constitution of the physical component constitution table 400 of physical hardware constitution information acquisition I/F 320. The physical component constitution table 400 is constituted by resource #405 showing consecutive numbers of resources, resource type 410 showing types of resources, range 415 showing ranges of resources in correspondence with consecutive numbers, component #420 showing consecutive numbers of respective components, component type 425 showing types of components, power consumption 430 of resources specified by consecutive numbers, power consumption 435 of components for operating the resources.

In the explanation of the embodiment, component #420 indicates an object constituting an object of physical insertion/extraction or on/off of power source as in CPU socket 110 or I/O hub 160, and a plurality of resources can be connected onto one component #420. In the example of the embodiment, CPU core or DIMM 150 is connected to a component referred to as CPU socket 110, and I/O adaptor 180 is connected to a component referred to as I/O hub 160. When the memory controller 130 is separated from the CPU socket 160, or when a chip set is present, these can also be independent components. The physical component constitution table 400 is a table showing inclusion relationships of resources and components. The table shows that resources indicated by range 415 are included in component #420. When resource type 410 is memory, in addition to numbers of corresponding DIMM 150, also range of physical address is shown. In this example, 1 GB per 1 DIMM, and therefore, divided into 4 in accordance with CPU sockets to which 16 GB from 0x0_0000_0000 to 0x0_3_FFFF_FFFF belong. Power consumption [W] when respective resources are brought into an operating state is shown in 430 and power consumption when component constituting a base of resource is brought into an operating state is shown in 435. For example, assume that core #0 is operated and core #1 is not operated. In this case, although power consumption of resource is 20 since power consumption per core is 20, power consumption of CPU socket of component constituting the base is 80 according to physical component constitution table 400, and therefore, a total of 20+80=100 constitutes power consumption when core #0 is operated. Further, although here, in order to reduce size of the physical component constitution table 400, 1 entry is shown by summarizing a plurality of resources belonging to the same component, entry which differs for respective resources may be used.

Further, as power consumption 430 of resource and power consumption 435 of component, data previously set to ROM 221 of the service processor 220 is used. Further, the ROM is stored with information related to a function of a component such as power consumption of I/O adaptor 180, band or latency between respective components and the like.

FIG. 4 shows a constitution of the I/O adaptor constitution table 450. In the I/O adaptor constitution table 450, entry of all of I/O adaptors 180 on multiprocessor system 100 is present, and the I/O adaptor constitution table 450 is constituted by respective items of I/O adaptor #455 indicating consecutive numbers of I/O adaptor 180, I/O adapter 460 indicating identification data of I/O adaptor, I/O slot #465 mounted with I/O adaptor, adaptor type 470 indicating type of I/O adaptor, and power consumption 475 of I/O adaptor. The adaptor type 470 is described with type of adaptor of network interface card (NIC) or host bus adaptor (HBA).

FIG. 5 shows a constitution of the intercomponent distance corresponding table 500. According to the intercomponent distance corresponding table 500, entry in correspondence with all of components on the multiprocessor system 100 is present, and the intercomponent distance corresponding table 500 is constituted by component #420 indicating identification data of component, component type 425 indicating type of component, and intercomponent distance 510 indicating a distance between the component and other component. The intercomponent distance 510 is classified by all of components, and indicates a distance of arriving at component of intercomponent distance 510 from component of component #420. When there are N pieces of components in a total of the system, the intercomponent distance 510 constitutes a matrix of N×N. Normally, a distance of arriving at its own component is conceived to be 0, and therefore, it is normal that 0 is aligned at a diagonal portion of the matrix. According to the embodiment, it is assumed that all of functions of intermodule connection I/F 200 are equivalent, and therefore, the distance is constituted by a number of times of reaching the object component by how many times the intermodule connection I/F 200 is crossed. The distance is dealt with as physical position information of component. For example, according to a distance from CPU socket 110a to I/O hub 160b, in FIG. 1, a distance from CPU socket 110a to CPU socket 110d is constituted by way of intermodule connection I/F 200 by one time and a distance from CPU socket 110d to I/O hub 160b is constituted by way of intermodule connection I/F 200 by one time, and therefore, the distance between the components becomes a total of 2.

Further, when the intermodule connection I/F is non-uniform, a method of indicating a distance by using a total value of latency 570 present in the physical network constitution table 550 mentioned later is conceivable.

Further, according to the embodiment, memory 150 is directly connected to CPU socket 110, and therefore, a distance between CPU socket 110 and memory 150 is 0, and therefore, the distance is not included in the intercomponent distance corresponding table 500, however, when memory 150 is connected to an internal network (intermodule connection I/F 200), memory 150 may be added to component #420 and distances between respective components may be set to the intercomponent distance corresponding table 500.

Further, the intercomponent distance corresponding table 500 can be formed by virtual machine monitor 300 based on information of physical hardware constitution information acquisition I/F 320. Further, the service processor 220 may form the intercomponent distance corresponding table 500 based on information of physical hardware constitution information acquisition I/F 320 to be noticed to the virtual machine monitor 300.

FIG. 6 shows a constitution of the physical network constitution table 550. The physical network constitution table 550 is constituted by items indicating network #555 indicating consecutive numbers of connection of intermodule connection I/F 200 to all of intermodule connection I/F 200 on the multiprocessor system 100, which component 420a is connected to which component 420b, band 560 between components 420a and 420b and latency 570. According to the embodiment, whereas band 560 connecting CPU sockets 110 is 6, network band 560 connecting CPU socket 110 and I/O hub 160 is 3 of a half thereof. Further, a unit of band 560 is, for example, [Gbps], a unit of latency 570 is, for example, [nsec].

The above-described are items of physical hardware constitution information acquisition I/F 320. The service processor 220 collects information of these from respective resources components via module information acquisition I/F 210. Further, virtual machine monitor 300 acquires physical hardware constitution information acquisition I/F 320 from the service processor 220. With regard to information which cannot be provided by only inquiring to single member of module by the service processor 220 as in the physical network constitution table 550 or the intercomponent distance corresponding table 500, a method of automatically detecting a connection relationship by using inquiring protocol via module information acquisition I/F 210 and intermodule connection I/F 200 in initializing the multiprocessor system 210 or changing a constitution thereof, or a method of preserving information of a system control tool (present other than multiprocessor system 100) used by the controller in a nonvolatile memory or the like by the service processor 220 or the like and constituting the information based on the preserved information in changing the constitution is conceivable.

<Constitution of Virtual Server>

Figure 9:
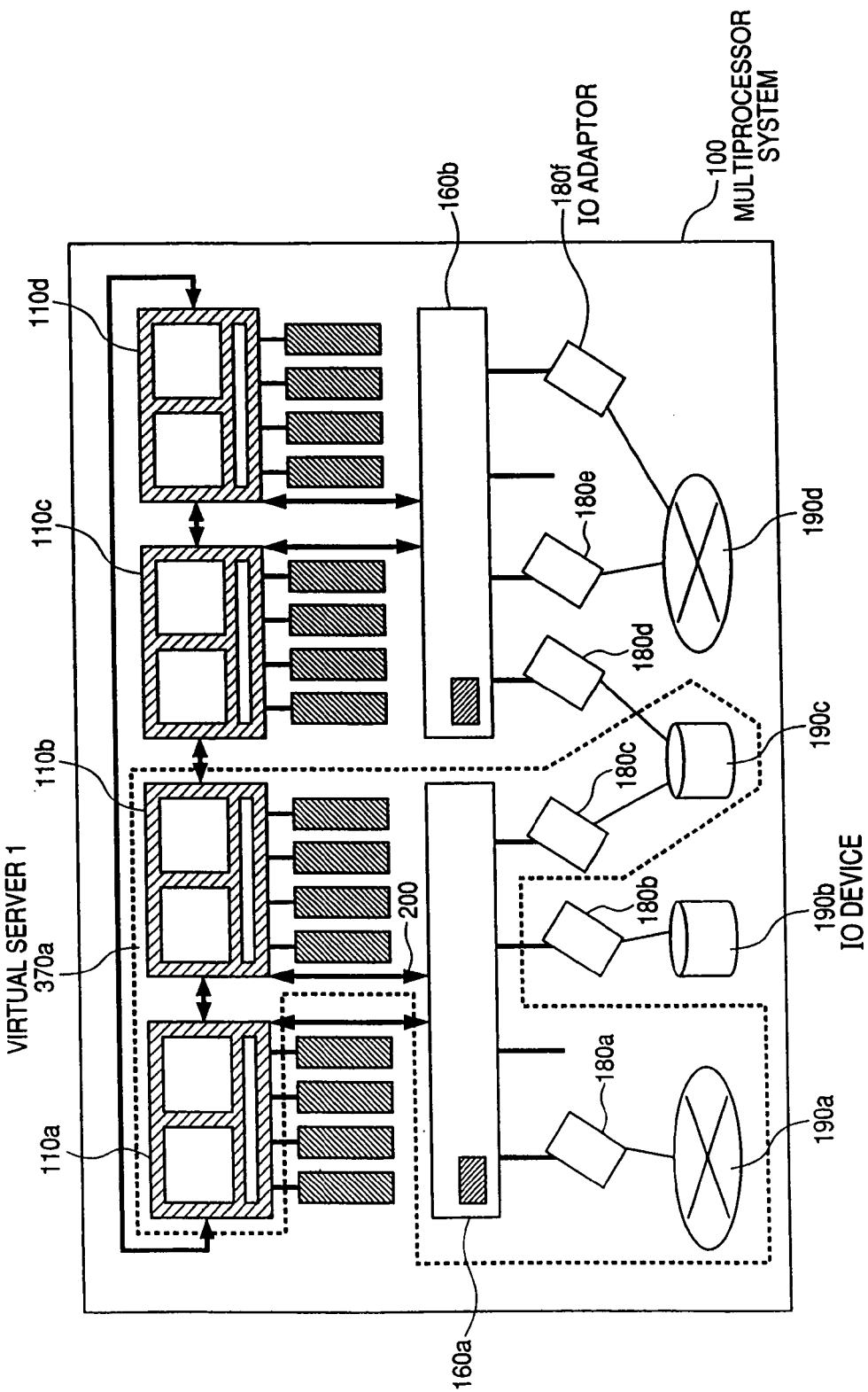
FIG. 9 is a block diagram showing an example of the virtual server 1 on a multiprocessor system showing the first embodiment.

FIG. 7 through FIG. 9 show logical hardware request I/F 350 of virtual server 1_370a according to the first embodiment and a constitution of a virtual server in correspondence therewith.

FIG. 7 shows a constitution of logical hardware request I/F 350a requesting resources necessary for starting virtual server 1_370a (refer to FIG. 9, FIG. 16) to virtual machine monitor 300 in starting guest OS 360. The logical hardware request I/F 350a is set by the controller by console 230.

The logical hardware request I/F 350a is constituted by #351 indicating consecutive number of virtual server, guest name 352 indicating identification data of guest OS 360 operated by the virtual server, I/O adaptor 353 allocated to the virtual server, CPU core NO.354 allocated to the virtual server, memory amount 355 allocated to the virtual server, resource allocation policy 356 indicating policy of resource allocated to the virtual server, and priority 357 of virtual server. Virtual server #351 is identification data for identifying the virtual server on the system which is not necessarily needed to be set by a requesting guest side. Guest name 352 is information for identifying respective guest OS 360, for example, also type of guest OS 360 (Windows (trade mark)/Linux or the like) is included wherein. I/O adaptor 353 is a list of I/O adaptor 180 requested by the guest OS. Here, I/O adaptors 180a and 180c are requested. The CPU core NO.354 is a number of CPU cores necessary for guest OS 360a. Here, 4 cores are needed. Memory amount 355 is a memory amount necessary for guest OS 360a. Here, an amount of 4 GB is needed. The resource allocation policy 356 indicates a policy in allocating resources and is a parameter of constituting a key according to the invention. As the resource allocation policy 356, for example, the following policy is conceivable.

function priority: an arrangement of shortening a distance between components is selected CPU core memory priority: a distance between CPU and a memory is shortened (which is effective when memory access of CPU is frequent)

CPU-I/O priority: a distance between CPU and an I/O device is shortened (which is effective when I/O interruption is frequent)

I/O device-memory priority: a distance between I/O device and a memory is shortened (which is effective when DMA transfer from I/O device is frequent)

CPU-I/O device-memory priority: respective resources are arranged to be proximate (when a total function of virtual server is balanced)

reliability priority: component network common among virtual servers is reduced band priority: effective band of network is enlarged power conservation priority: power consumption of a total of system is reduced In the following explanation of the embodiment, an example of set policy is constituted by CPU-I/O priority in function priority. However, virtual server 1 (360a) is first virtual server on the multiprocessor system 100, and therefore, a possibility of capable of acquiring resource basically requested is high. Priority 357 is a parameter used for determining which virtual server has a priority when resources requested among virtual servers are competing. As an example indicating priority, here, it is shown that the larger the value in integer, the higher the priority. However, it is assumed that according to the embodiment, all of virtual servers are provided with an equal priority.

Further, although according to the embodiment, only one policy is given to virtual server, a constitution in which primary policy having high priority and secondary policy having low priority are given and in a constitution satisfying the primary policy, the secondary policy is further satisfied as much as possible may be selected. Further, interface weighting a plurality of policies by numerical values is also conceivable. Here, for simplifying an explanation, only one policy is constituted.

FIG. 8 shows a constitution and a content of the physical-logical hardware allocation table 310 in correspondence with a result of allocating physical resource by logical hardware allocation processing portion 801 of virtual machine monitor 300 based on logical hardware request I/F 350a of virtual server 1_370a shown in FIG. 7. Further, a processing of allocating hardware resources by virtual machine monitor 300 will be described in details in reference to FIG. 55 through FIG. 63 described later.

The physical-logical hardware allocation table 310 is constituted by virtual server 351 indicating consecutive NO. of virtual server, on/off 311 indicating a state of starting the virtual server, I/O adaptor 312 as used resource indicating resource used by the virtual server, CPU core 313, memory 314, used component #315, used network #316. According to the embodiment, in accordance with logical hardware request, I/F 350a, I/F adaptor #1, 3, CPU core #0, 1, 2, 3, DIMM #4, 5, 6, 7 are allocated to virtual serer 1_370a. Further, in memory 314 of used resource #, an amount of 4 GB of corresponding physical address is constituted from 0×1_0000_0000 (the 0×1_0000_0000 may be referred to as base address of virtual server 1). Further, an example of setting 110a, 110b, 160a to used component #315 as identification data of component mounted with the resources and setting #1, 5, 6 to used network #315 as network # used in connection is shown.

A specific procedure of forming the physical-logical H/W allocation table 310 of FIG. 8 from logical hardware (HW) request I/F 350 of FIG. 7 will be described later.

FIG. 9 shows virtual server 1_370a allocating logical hardware allocation processing portion 801 of virtual machine monitor 300 onto the multiprocessor system 100 based on logical hardware request I/F 350a and the physical-logical hardware (HW) allocation table 310. A portion in the drawing surrounded by a dotted line indicates resource allocated to virtual server 1_307a in resources of FIG. 1.

<Operation in First Embodiment>

An operation of the first embodiment will be explained in reference to FIGS. 10 through 17 as follows.

FIG. 10 and FIG. 11 indicate logical hardware requests I/F 350b and 350c to next virtual server 2 after allocating virtual server 1_307a as shown by FIG. 9 by logical hardware allocation processing portion 801 of virtual machine monitor 300. Both of the logical hardware requests I/F 350b and 350c request the same I/F adaptor 353, CPU core NO.354, the memory amount 355. A difference is in resource allocation policy 356, whereas "CPU-memory priority" is constituted in logical hardware request I/F 350b, "I/O-memory priority" is constituted in logical hardware request I/F350c. In the following examples, a behavior of allocating different resources by the difference of policies will be shown.

FIG. 12 and FIG. 13 show 2 ways of physical-logical hardware allocation tables 310 of a result of carrying out allocation by logical hardware allocation processing portion 801 of the virtual machine monitor 300 to logical hardware request I/F 350 of FIG. 10, FIG. 11 to the virtual server 2. Although I/O adaptors 312 are the same #2 in both of the tables, used CPU cores 313 and memory 314 differ. Whereas on a side of physical-logical hardware allocation table 310b of FIG. 12, CPU cores #4, 5 and DIMM #8, 9, 10, 11 are allocated, in physical-logical hardware allocation table 310c of FIG. 13, CPU cores #6, 7 and DIMM #0, 1, 2, 3 are allocated. Although a way of allocating resource is conceivable other than the 2 ways, candidates of a number of allocating ways are narrowed by excluding an allocating way which remains unchanged essentially or the like.

According to the logical hardware request I/F 350b of FIG. 10, a policy of CPU-memory priority is requested, and therefore, by allocating CPU cores #4, 5 of CPU socket 110c and memories #8 through 11 connected to CPU sockets 110c to the virtual server 2 and making a distance of resource 0, one having a short distance of CPU and memory is selected. On the other hand, in logical hardware request I/F 350c of FIG. 11, policy of I/O-memory priority is requested, and therefore, memories #0 through #3 the most proximate to I/F adaptor #2 are selected such that a distance of I/F device and memory is the shortest. In this way, the logical hardware allocation processing portion 801 of virtual machine monitor 300 can optimize hardware resource allocated to the virtual server in accordance with requested policy.

FIG. 14 shows an interresouce distance calculation table 600b calculating a distance between respective resources by virtual machine monitor 300 in correspondence with the allocation table 310b shown in FIG. 12. The interresouce distance calculation table 600b is a table for calculating NO.#351 of virtual server indicating identification data (or consecutive NO.) of virtual server and distances among resources in virtual server for respective virtual server numbers #351. In category 601, 3 types of categories of CPU-memory, I/O memory, CPU-I/O in correspondence with resource allocation policies are present. Virtual machine monitor 300 calculates intercomponent distance 604 from resource from 602 to resource to resource 603 for respective categories 601 in accordance with belonging component # and the intercomponent distance corresponding table 500. According to the example, CPU cores #4, #5 and DIMM #8, 9, 10, 11 are all mounted on the same component 110c, and therefore, intercomponent distance 604 becomes 0. On the other hand, a distance of component 160a mounted with I/O adaptor #2 and component 110c mounted with DIMM #8, 9, 10, 11 is 2 in accordance with intercomponent distance corresponding table 500, and therefore, intercomponent distance 604 becomes 2. Also a distance between CPU cores #4, 5, and I/O adaptor #2 similarly becomes 2. Finally, total sum 605 of distances between components is calculated for respective categories 601. According to the example, the distance becomes 0 in CPU-memory, 2 in I/O memory, 4 in CPU-I/O.

FIG. 15 shows interresource distance calculation table 600c in correspondence with physical-logical hardware allocation table 310c shown in FIG. 13. A distance between component 110d mounted with CPU cores #6, #7 and component 110a mounted with DIMM #0, 1, 2, 3 is 1, and therefore, intercomponent distance 604 becomes 1. On the other hand, a distance between mounted component 160a of I/O adaptor #2 and mounted component 110a of DIMM #0, 1, 2, 3 is 1, and therefore, intercomponent distance 604 becomes 1. Finally, a distance of mounted component 110d of CPU cores #6, 7 and component 160a mounted with I/O adaptor #2 is 2, and therefore, intercomponent distance 604 becomes 2. Total sum 605 of intercomponent distances is 2 in CPU-memory, 1 in I/O-memory and 4 in CPU-I/O.

A candidate satisfying resource allocation policy the most is selected from resource allocation candidate calculating the interresource distance calculation table 600 as described above. In a case of "CPU-memory priority" of 350b, resource allocation reducing a value of CPU-memory of total sum 605 of intercomponent distance is selected. In contrast thereto, in case of I/O memory priority", resource allocation of reducing a value of I/O memory of total sum 605 of the intercomponent distance is selected. When physical-logical hardware allocation tables 310b and 310c are compared, in case of "CPU-memory priority", 310b is selected, in case of "I/O memory priority", resource allocation of 310c is selected, respectively.

Figure 16:
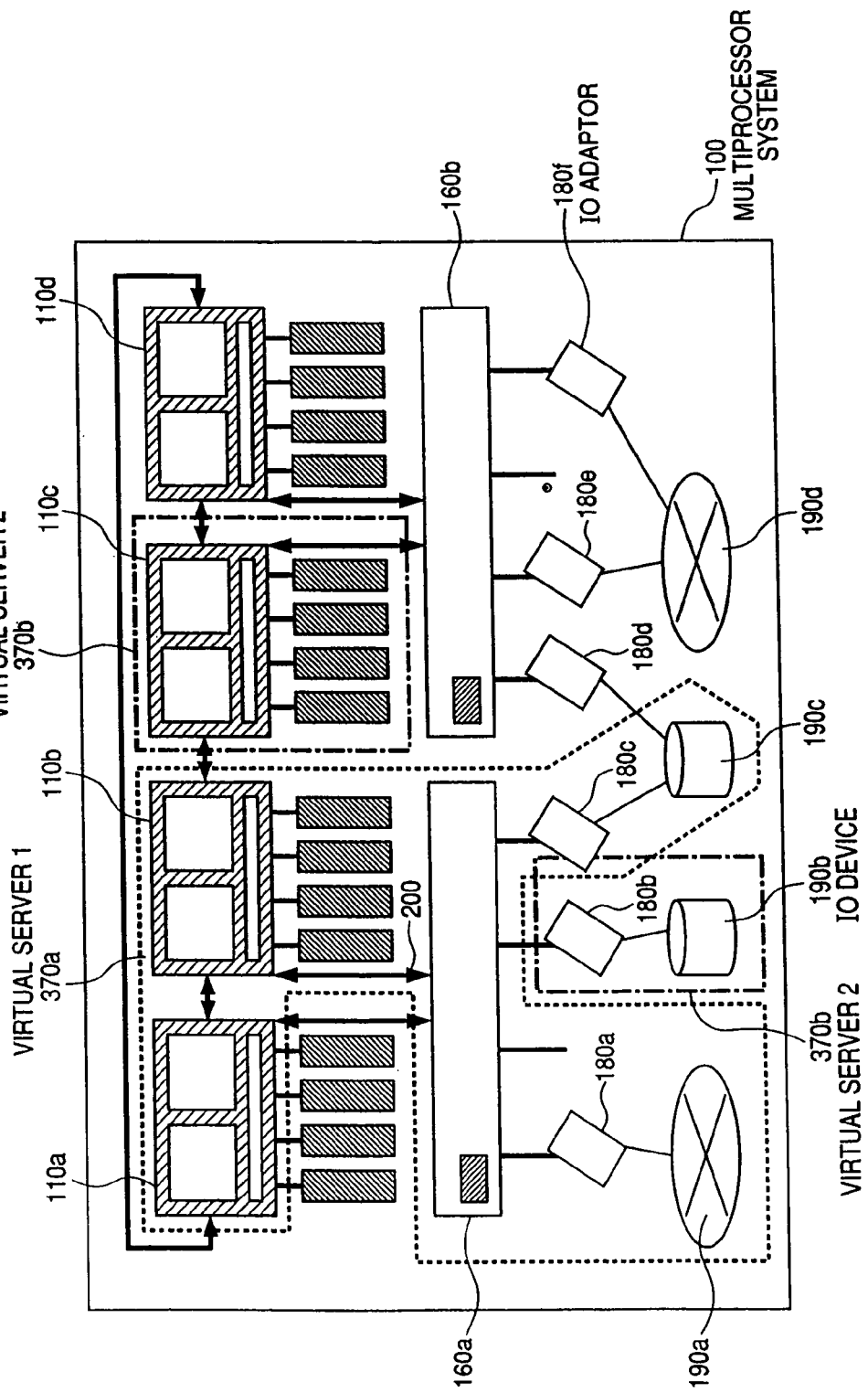
FIG. 16 is a block diagram showing constitutions of the virtual servers 1 and 2 on a multiprocessor system constituting a policy by CPU-memory priority showing the first embodiment.

FIG. 16 is a constitution view of virtual server 2_307b in correspondence with physical-logical hardware allocation table 310b shown in FIG. 12. As shown by a one-dotted chain line in the drawing, virtual server 2_370b is constituted from CPU socket 110c and memories connected thereto, and I/O adaptor 180b.

Figure 17:
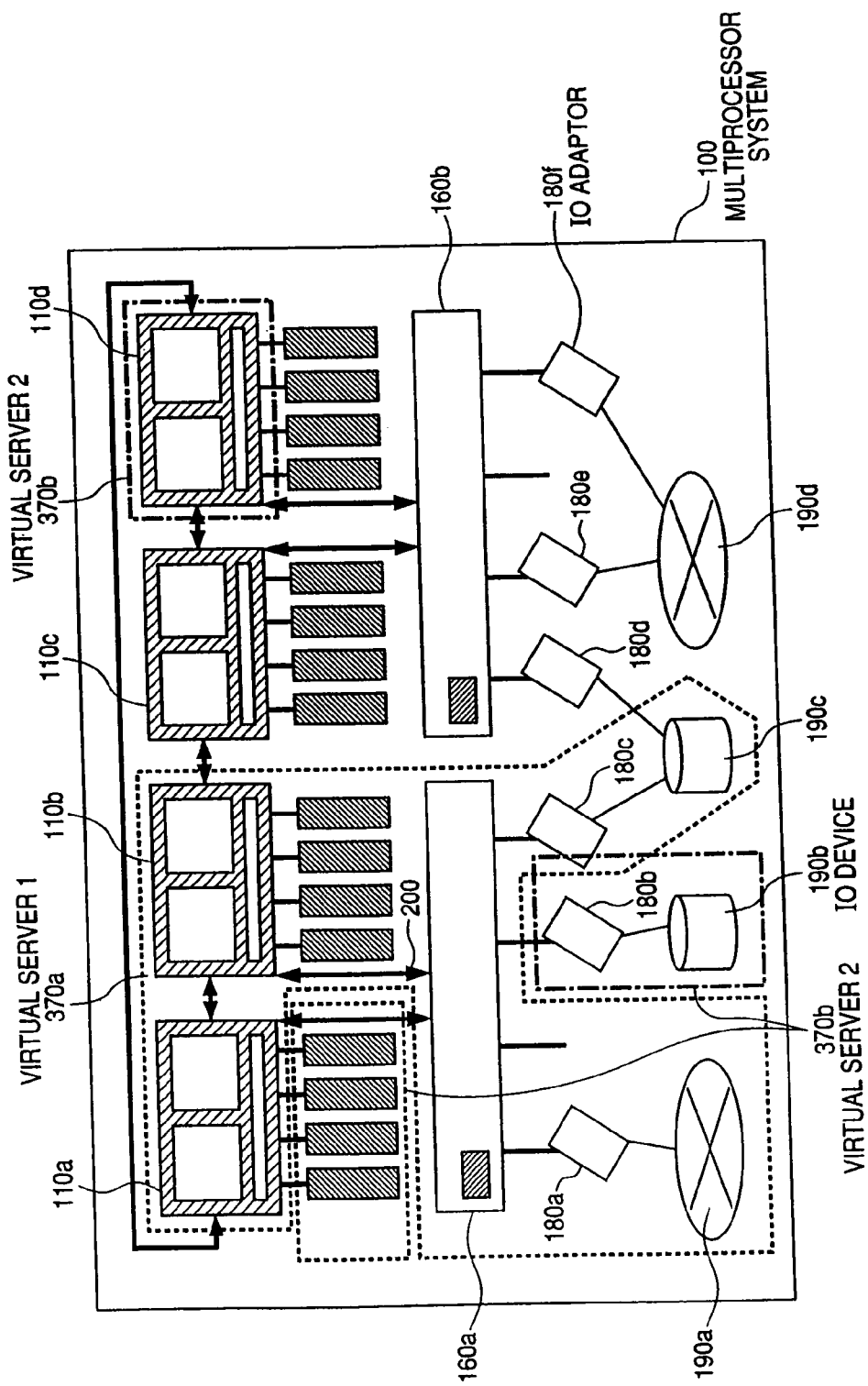
FIG. 17 is a block diagram showing constitutions of the virtual servers 1 and 2 on the multiprocessor system constituting a policy by I/O-memory priority showing the first embodiment.

FIG. 17 is a constitution view in correspondence with physical-logical hardware table 310c shown in FIG. 13. As shown by a one-dotted chain line in the drawing, virtual server 2_370b is constituted from CPU cores #6, 7 on CPU socket 110d, DIMM #0, 1, 2, 3 on CPU socket 110a, I/O adapter 180b.

By the above-described example, by difference of resource allocation policy of logical hardware request I/F 350, even when the same I/O adaptor CPU core NO memory amount is requested, different resources can be allocated and virtual server desired by the controller can automatically be constituted.

<Modification 1>

Figure 20:
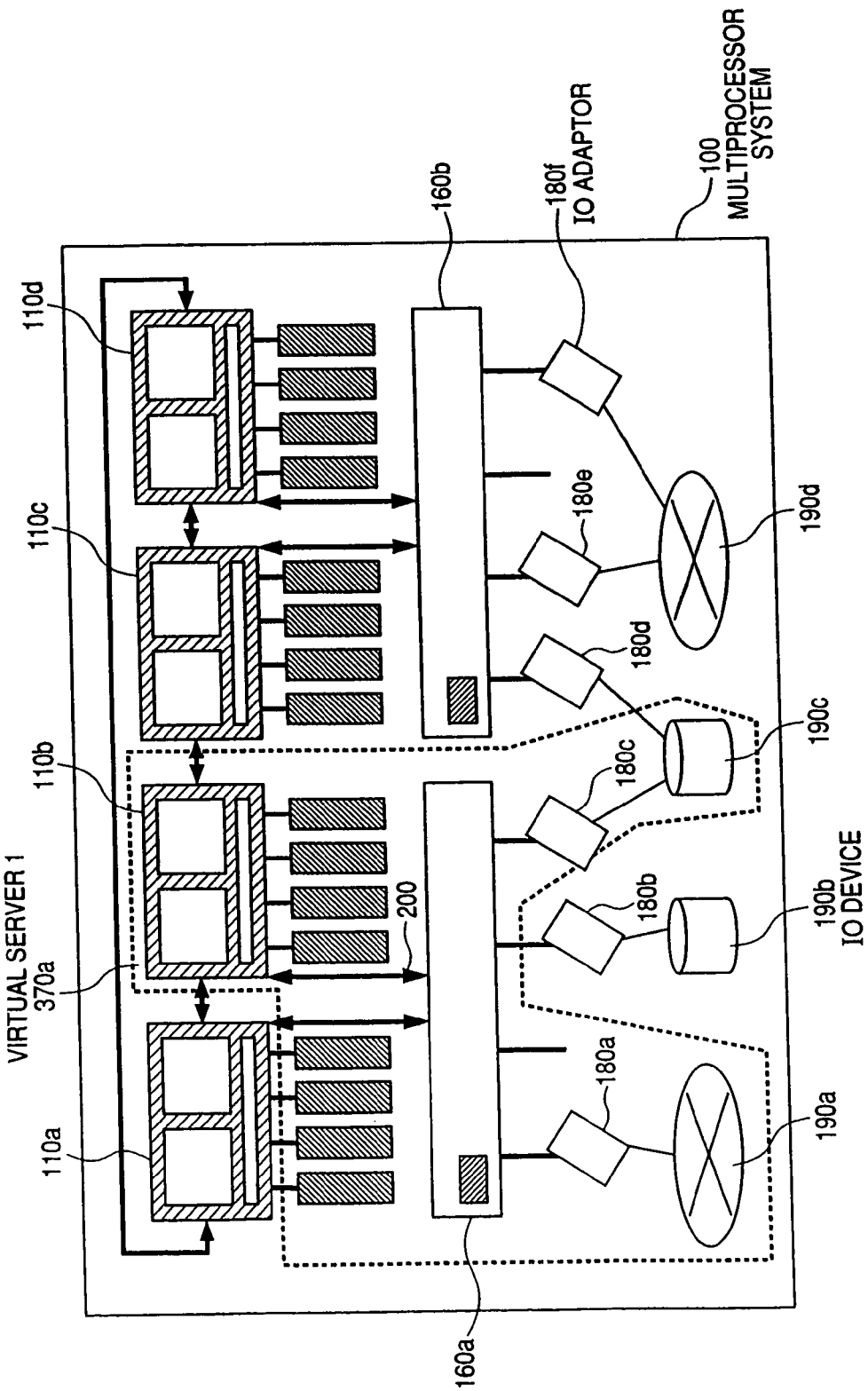
FIG. 20 is a block diagram showing a constitution of the virtual server 1 on a multiprocessor system showing the first modification.

Successively, a first modification of the first embodiment will be shown. In FIG. 18 through FIG. 20, logical hardware request I/F 350d of the virtual server 1_307a in modification 1 is shown in FIG. 18, physical-logical hardware allocation table 310d of a result of carrying out allocation by logical hardware allocation processing portion 801 of the virtual machine monitor 300 from logical hardware request I/F 350d is shown in FIG. 19, and a constitution of virtual server 1_370a is shown in FIG. 20. 180a and 180c are requested as I/O adaptors similar to the first embodiment, different from the first embodiment, virtual server 1 requests two CPU cores and memory of 8 GB. In response to the request, logical hardware allocation processing portion 801 of virtual machine monitor 300 allocates resources as shown by FIGS. 19, 20 from policy of CPU-I/O priority constituting request policy.

Successively, in FIGS. 21 through 28, a case of requesting resource of virtual server 2 by logical hardware request I/F 350e shown in FIG. 21 and requesting resource of virtual server 2 by logical hardware request I/F 350f shown in FIG. 22 after allocating virtual server 1 of FIG. 18 through FIG. 20 is shown. The virtual server 2 requests I/O adapter 180b and memory of CPU core NO.2, 4 GB similar to the first embodiment. In contrast thereto, in logical hardware request I/F 350e of FIG. 21, "CPU-memory priority" is designated as resource allocation policy 356 and in 350f, "CPU-I/O priority" is designated as resource allocation policy 356.

FIG. 23 and FIG. 24 show examples of different resource allocation to virtual server 2 of physical-logical hardware allocation tables 310e, 310f of FIG. 21, FIG. 22, showing a result of carrying out allocation by logical hardware allocation processing portion 801 of virtual machine monitor 300. Whereas in physical-logical allocation table 310e, CPU core and memory are allocated on the same CPU socket 110c, in physical-logical hardware allocation table 310f, CPU core is allocated on CPU socket 110a and DIMM is allocated on CPU socket 110d.

FIG. 25 and FIG. 26 show a result of calculating interresource distance calculation tables 600e, 600f in accordance with respective allocations of physical-logical hardware allocation tables 310e and 310f. In interresource distance calculation table 600e of FIG. 25, total sum 605 of intercomponent distance becomes 0 in CPU-memory, 2 in I/O memory, 4 in CPU-I/O. On the other hand, in interresource distance calculation table 600f of FIG. 26, total sum 605 of intercomponent distance becomes 2 in CPU-memory, 2 in I/O memory, 2 in CPU-I/O. As a result, in case of "CPU-memory priority", allocation of 310e having the small total sum 605 of intercomponent distance of CPU-memory is selected, in case of "CPU-I/O priority", allocation of 310f having the total sum 605 of intercomponent distance of CPU-I/O is selected.

Figure 27:
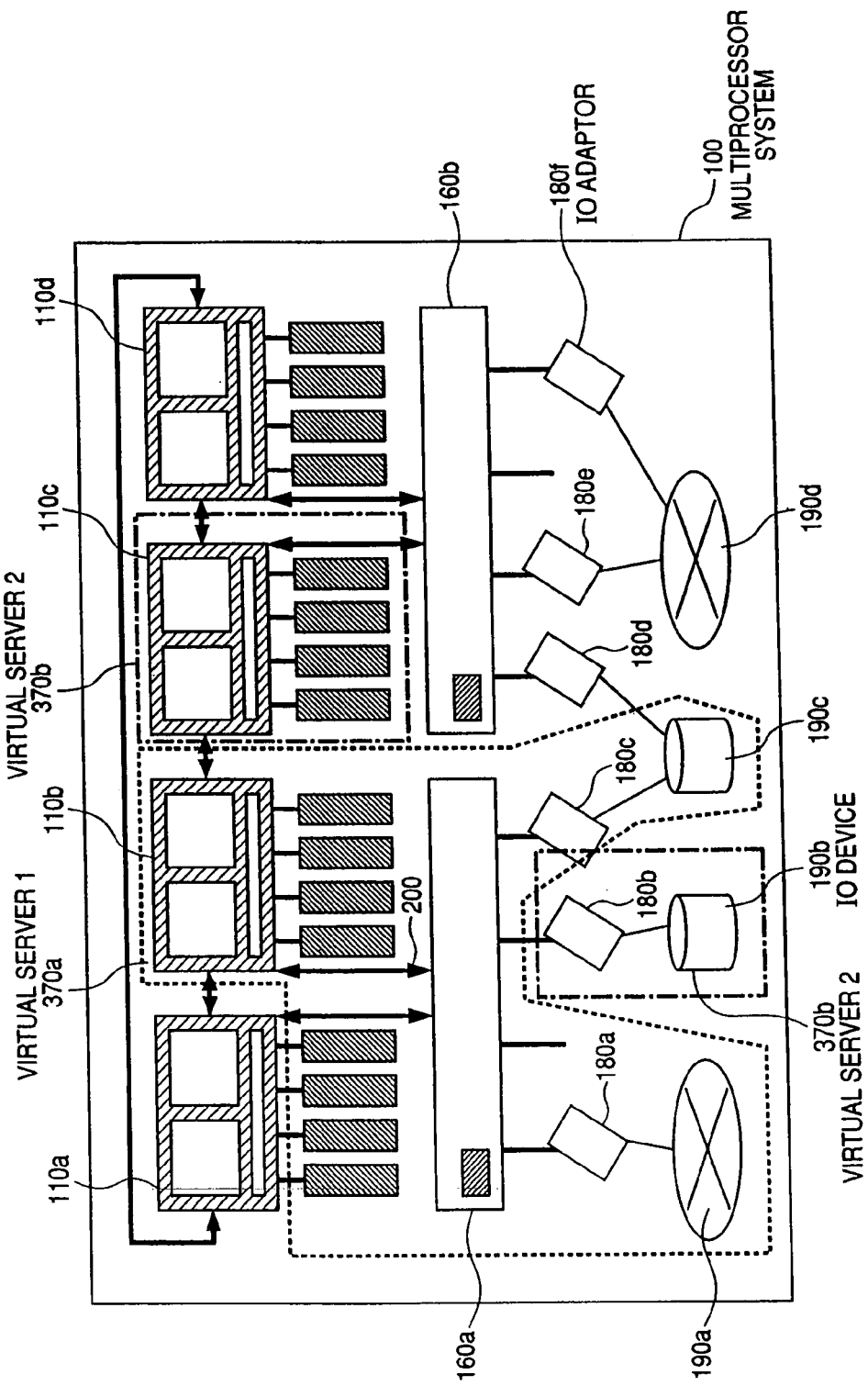
FIG. 27 is a block diagram of the virtual servers 1 and 2 on a multiprocessor system when a policy is constituted by CPU-memory priority showing the first modification.

FIG. 27 is a constitution view of virtual server in correspondence with physical-logical hardware allocation table 310e of. FIG. 23. Virtual server 1_370b is constituted by CPU cores #4, 5 on CPU socket 110c, DIMM #8, 9, 10, 11 and I/O adapter 180b.

Figure 28:
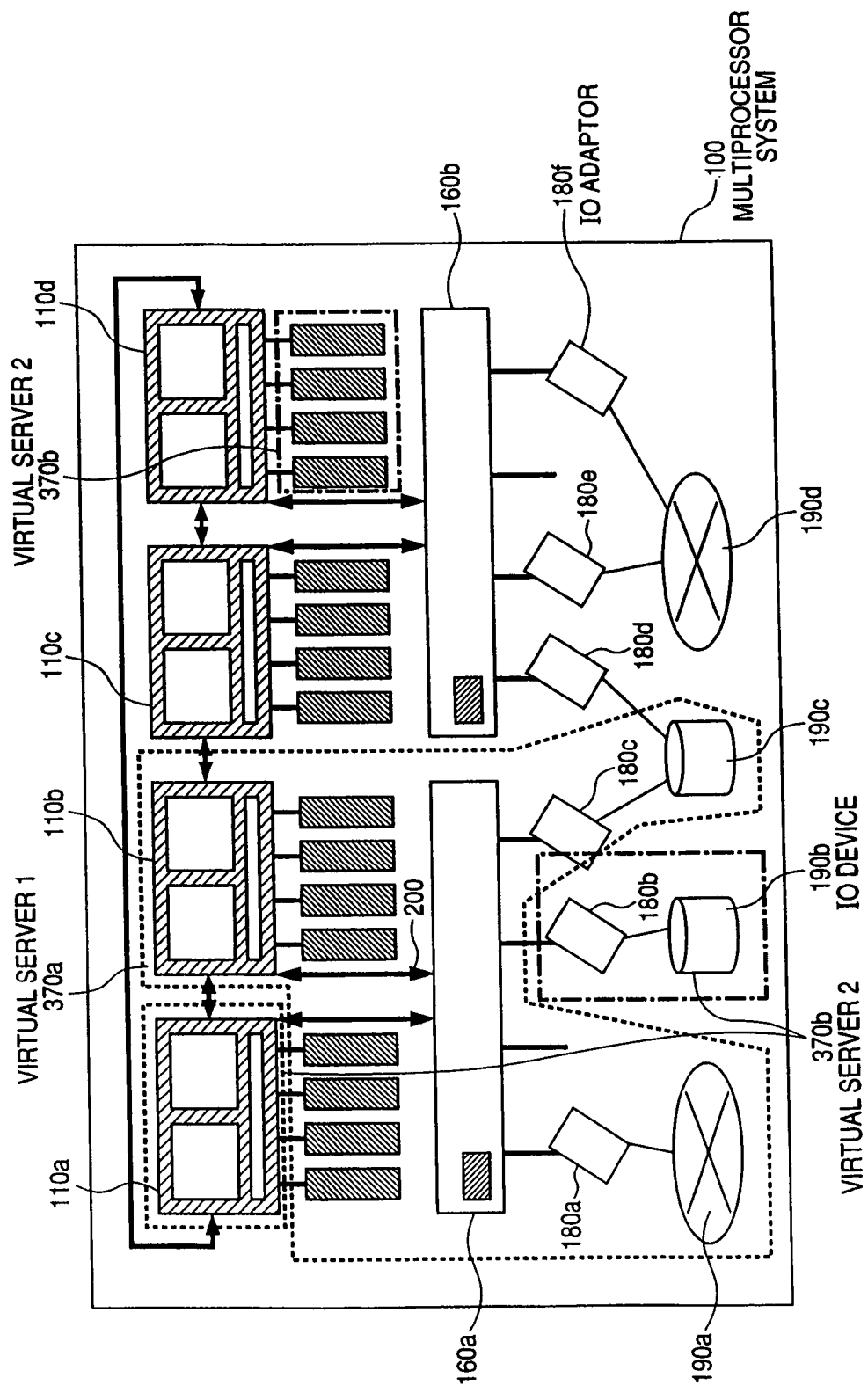
FIG. 28 is a block diagram of the virtual servers 1 and 2 on the multiprocessor system when a policy is constituted by CPU-I/O priority showing the first modification.

FIG. 28 is a constitution view of the virtual server in correspondence with physical-logical hardware allocation table 310f of FIG. 24. Virtual server 2_370b is constituted from CPU cores #0, 1 on CPU socket 110a, DIMM #12, 13, 14, 15 on CPU socket 110d, I/O adapter 180b.

The above-described is the first modification of the first embodiment.

<Modification 2>

Figure 31:
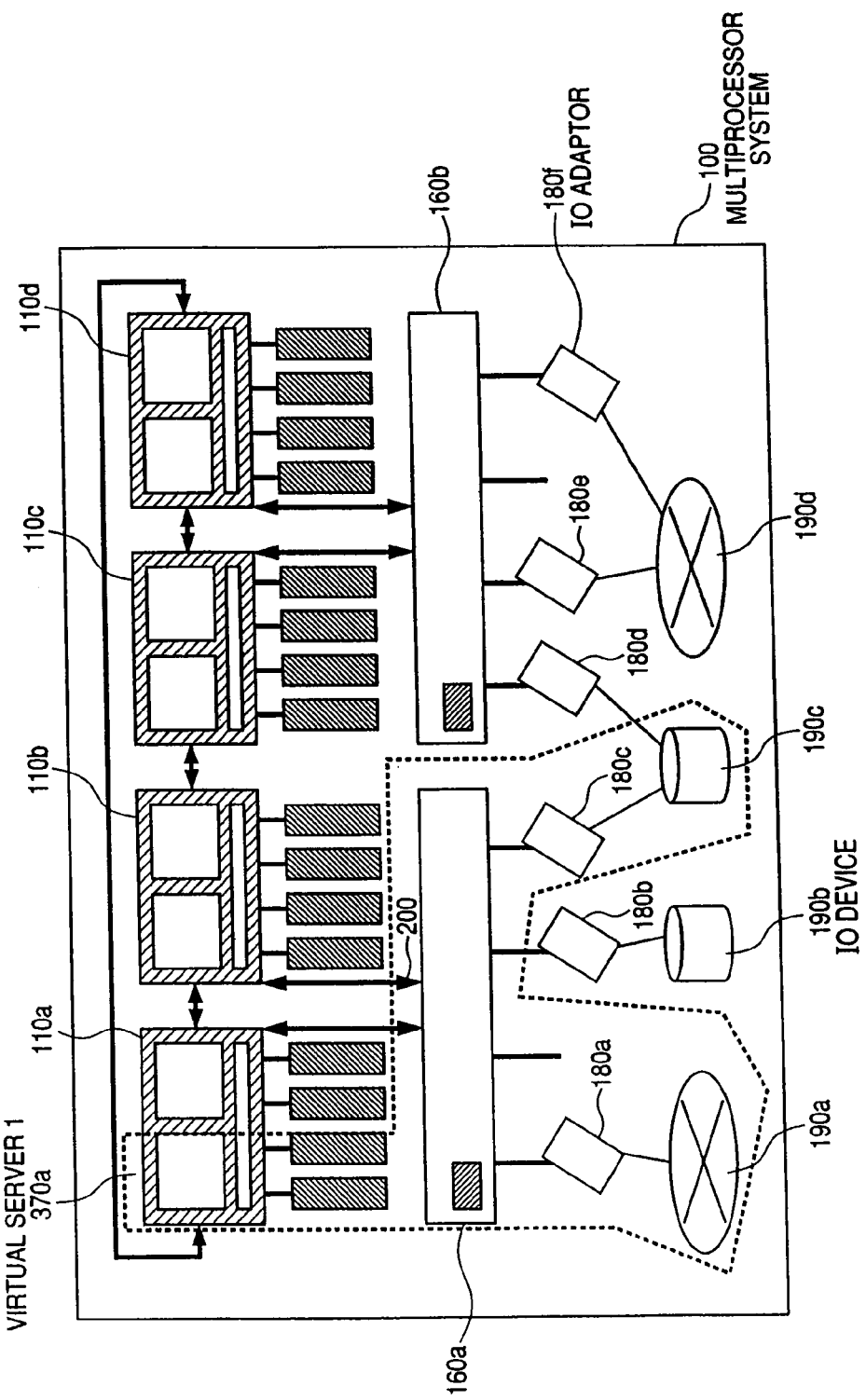
FIG. 31 is a block diagram showing a constitution of the virtual server 1 on a multiprocessor system showing the second modification.

Successively, a second modification of the first embodiment will be shown. In FIG. 29 through FIG. 31, logical hardware request I/F 350g of virtual server 1_370a according to the modification 2 is shown in FIG. 29, physical-logical hardware allocation table 310g is shown FIG. 30 and a constitution of virtual server 1_370a is shown in FIG. 31. As I/O adaptor, 180a and 180c are requested similar to the above-described first embodiment, however, only one CPU core and only 2 GB of memory are requested. Further, policy is CPU-memory-I/O priority, and an arrangement in which distances between respective components are made to be as proximate as possible is selected. This case is first virtual server, and therefore, the policy can be satisfied by first selecting CPU socket 110a proximate to I/O hub 160a connected with necessary I/O adaptors 180a, 180c and allocating CPU core and DIMM on 110a.

FIG. 32 through FIG. 34 show three logical hardware request I/Fs 350 in which only resource allocation policy 356 differs. Common to all, request I/F adaptor 353 is 180b, request CPU core NO.354 is 1, request memory amount 355 is 2 GB, priority is 5, commonly. Physical hardware request I/F 350h of FIG. 32 designates "reliability priority" as resource allocation policy 356. Logical hardware request I/F 350i of FIG. 33 designates "band priority" as resource allocation policy 356. Logical hardware request I/F 350j of FIG. 34 designates "power conservation priority" as resource allocation policy 356. In the following, it will be seen what constitutions are selected in accordance with respective policies.

FIG. 35 through FIG. 36 show physical-logical hardware allocation tables 310 in correspondence with 2 ways of resource allocation. In physical-logical hardware allocation table 310h of FIG. 35, requested policy of reliability priority is satisfied by allocating CPU core #2 and DIMM #4, 5 on CPU socket 110b different from that used by the virtual server 1 as CPU core and memory. On the other hand, in physical-logical hardware allocation table 310i of FIG. 36, requested policy of band priority is satisfied by allocating CPU core #1 and DIMM #2, 3 on CPU socket 110a the same as that used by virtual server 1.

When allocated policy is not distance priority as in the above-described embodiment, other index substituting for interresource distance calculation table 600 is needed as a reference of resource allocation.

FIG. 37 through FIG. 38 show component-network allocation table 650 substituting for interresource distance calculating table 600. The component-network allocation table 650 is a table for investigating component, network, and effective network band shared by a plurality of virtual servers by logical hardware allocation processing portion 801 of virtual machine monitor 300, and is constituted from items of virtual server #351 indicating identification data or consecutive number of virtual server, sharing component #651 indicating identification data of component shared among virtual servers, and sharing network #652 indicating identification data of network utilized for using sharing component., and-respective items of network #653, sharing NO.654, effective band 655 in correspondence with all of network used in respective virtual servers.

The component-network allocation table 650h of FIG. 37 is a table in correspondence with resource allocation of physical-logical hardware allocation table 310h of FIG. 35. As sharing component #651, I/O hub 160a corresponds thereto, sharing network #652 is not present. Respective networks #653 are not shared, and therefore, sharing NO.654 becomes 1. Effective band 655 becomes a value dividing a value of band 560 in correspondence with respective networks #555 of physical network constitution table 550 by sharing NO.654 (that is, NO. of virtual servers). In this case, the sharing NO. is 1, and therefore, a value of band network becomes effective band 655 as it is.

The component network allocation table 650i of FIG. 38 is a table in correspondence with resource allocation of physical-logical hardware allocation table 310i of FIG. 36. As sharing component #651, I/O hub 160a and CPU socket 110a correspond thereto. Further, as sharing network #652, network #5 of connecting I/O hub 160a and CPU socket 110a corresponds thereto. In this case, the sharing NO.654 is 2, and therefore, effective band 655 becomes a value of a half of band 560 of original network.

When resource allocation policy 356 is "reliability priority", a constitution in which sharing component NO. sharing network NO. is as small as possible is selected. In this case, I/O adaptors requested by the virtual server 1 and the virtual server 2 are on the same I/O hub 160a, and therefore, sharing component NO. cannot be made to be 0. However, when component network allocation tables 650h, 650i respectively in correspondence with physical-logical hardware allocation tables 310h and 310i are compared, it is known that sharing component NO. is smaller in that in correspondence with physical-logical hardware allocation table 310h shown in FIG. 35. Therefore, with regard to request of logical hardware request I/F 350h of FIG. 32 in which requested policy is "reliability priority", allocation of physical-logical hardware allocation table 310h shown in FIG. 35 is selected.

When resource allocation policy 356 is "band priority", a constitution in which effective band of network is as large as possible is selected. In this case, when component network allocation table 650h of FIG. 37 and 650i are compared, effective band is larger on a side of a constitution of component network allocation table 650h. Therefore, with regard to request of logical hardware request I/F 350i in which policy is "band priority", allocation of physical-logical hardware allocation table 310h of FIG. 37 in which effective band is maximized is selected.

FIG. 39 shows allocation resource power consumption calculation table 700h in correspondence with physical-logical hardware allocation table 310h of FIG. 35 used in a case in which requested policy is power conservation priority. The table is constituted not by a unit of virtual server but by virtual machine monitor 300 for resource and component used in a total of a system, and is constituted by category 701 indicating whether object hardware is resource or component, 702 indicating resource type/component type, used resource/component #703 indicating identification data of used resource or component, power consumption 704 indicating power consumption for respective resources, and total sum 705 of power consumption. As resources, there are respective items of CPU core, memory, I/O slot, I/O adaptor and used resources are enumerated. Further, power consumption 704 refers to items of resource power consumption 430 of the physical component constitution table 400, and power consumption 475 of the I/O adaptor constitution table 450 and sets respective values. In entry of component of category 701, components necessary in using respective resources are enumerated, and power consumption 704 of component is set in accordance with component power consumption 435 of the physical component constitution table 400. Total sum 705 of power consumption is calculated by virtual machine monitor 300 as the total sum of power consumption 704.

FIG. 40 shows allocation resource power consumption calculation table 700i in correspondence with the physical-logical hardware allocation table 310i of FIG. 36. NO. per se of used resource remains unchanged in physical-logical hardware allocation tables 310h and 310i and therefore, items of resource almost stay the same although NO.# of used resource differs. What differs is an item of component, although a total of used components in the physical-logical hardware allocation table 310h is 3, a total of components used in the physical-logical hardware allocation table 310i is 2. Therefore, when total sums 705 of power consumption are compared, whereas total sum 705 is a value of 345 [W] in the allocation resource power consumption calculation table 700h of FIG. 39, in 700i, total sum 705 is a value of 265 [W].

When resource allocation policy 356 of logical hardware I/F 350 is "power conservation priority", the virtual machine monitor 307 selects an allocation method in which total sum 705 of power consumption is as small as possible. Therefore, with regard to request of logical hardware request I/F 350j of FIG. 34 in which policy is "power conservation priority", logical hardware allocation processing portion 801 of virtual machine monitor 300 selects allocation of physical-logical hardware allocation table 310i of FIG. 30.

Figure 41:
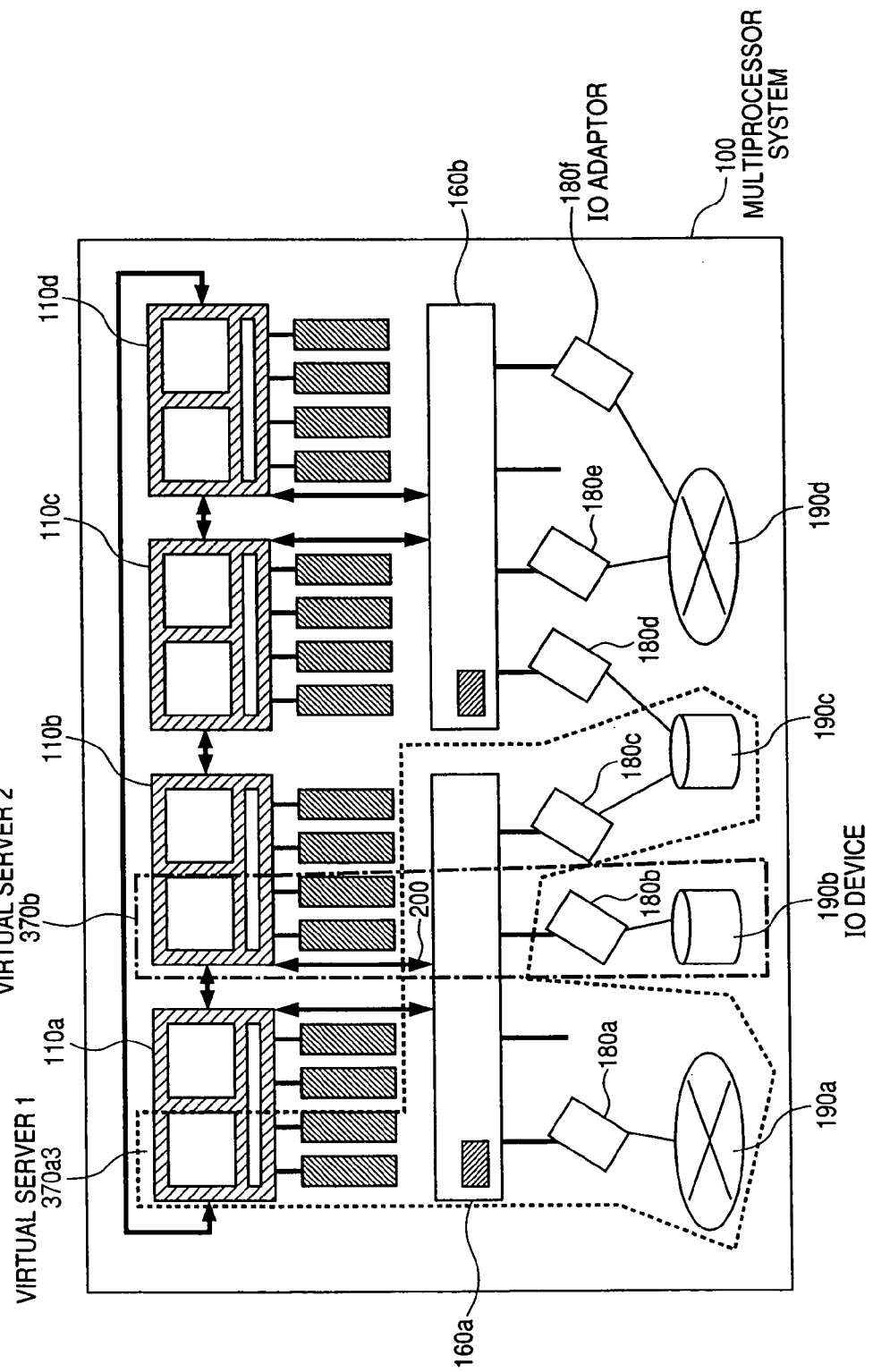
FIG. 41 is a block diagram of the virtual servers 1 and 2 on a multiprocessor system constituting a policy by reliability priority showing the second modification.

FIG. 41 is a constitution view of virtual server in correspondence with physical-logical hardware allocation table 310h of FIG. 36.

Figure 42:
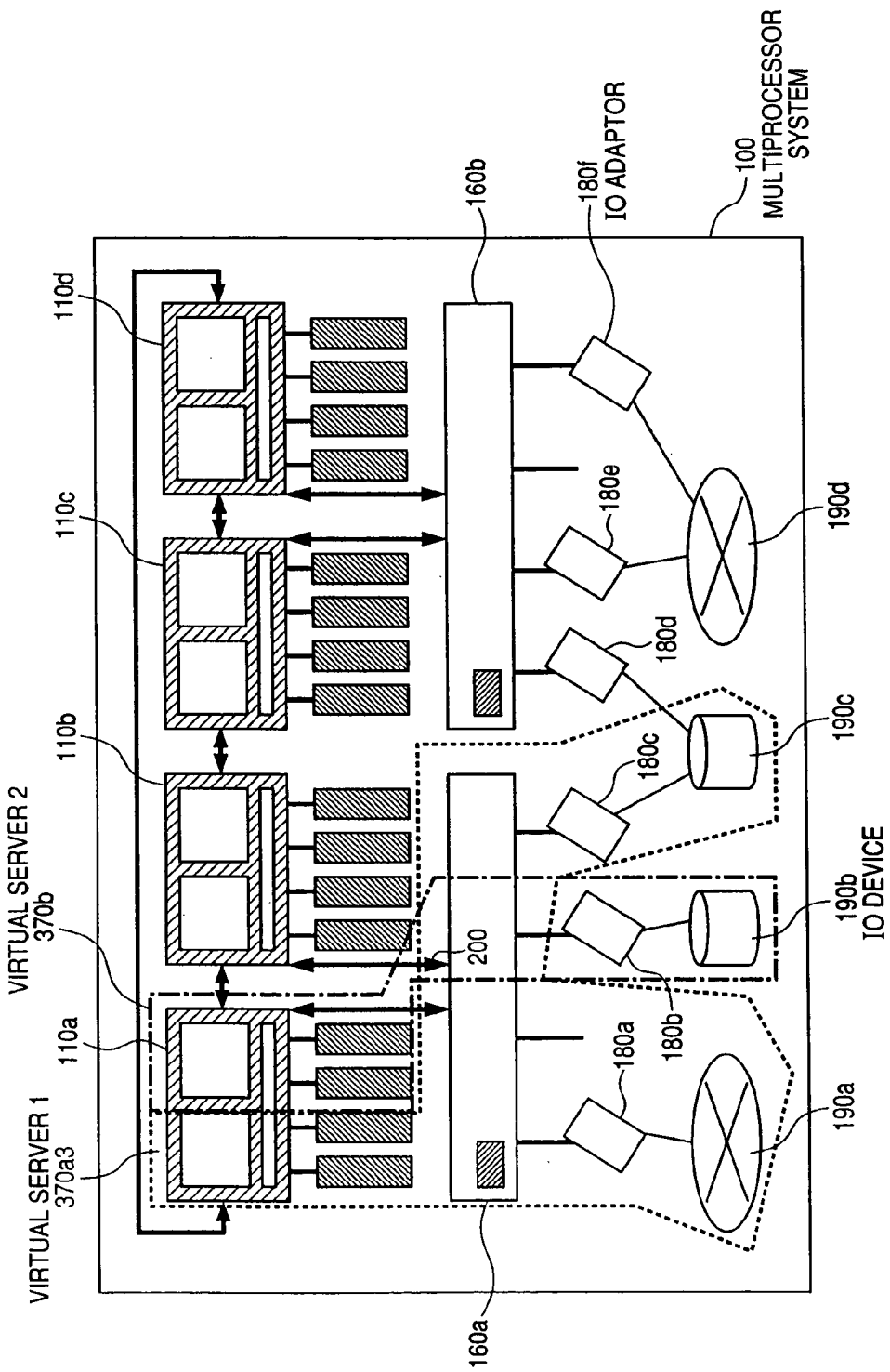
FIG. 42 is a block diagram of the virtual servers 1 and 2 on the multiprocessor system constituting a policy by band priority showing the second modification.

FIG. 42 is a constitution view of virtual server in correspondence with physical-logical hardware constitution table 310i of FIG. 37.

The above-described is the second modification of the first embodiment.

Further, in a case of a policy having a priority in power consumption in the above-described, in place of power consumption, heat generating amounts of respective resources and components may be used.

<Specific Procedure of Resource Allocation in First Embodiment>1

Here, a procedure of forming the physical-logical hardware constitution table 310 from the logical hardware constitution 350 according to the first embodiment will be explained in details in reference to FIGS. 55 through 62.

Figure 55:
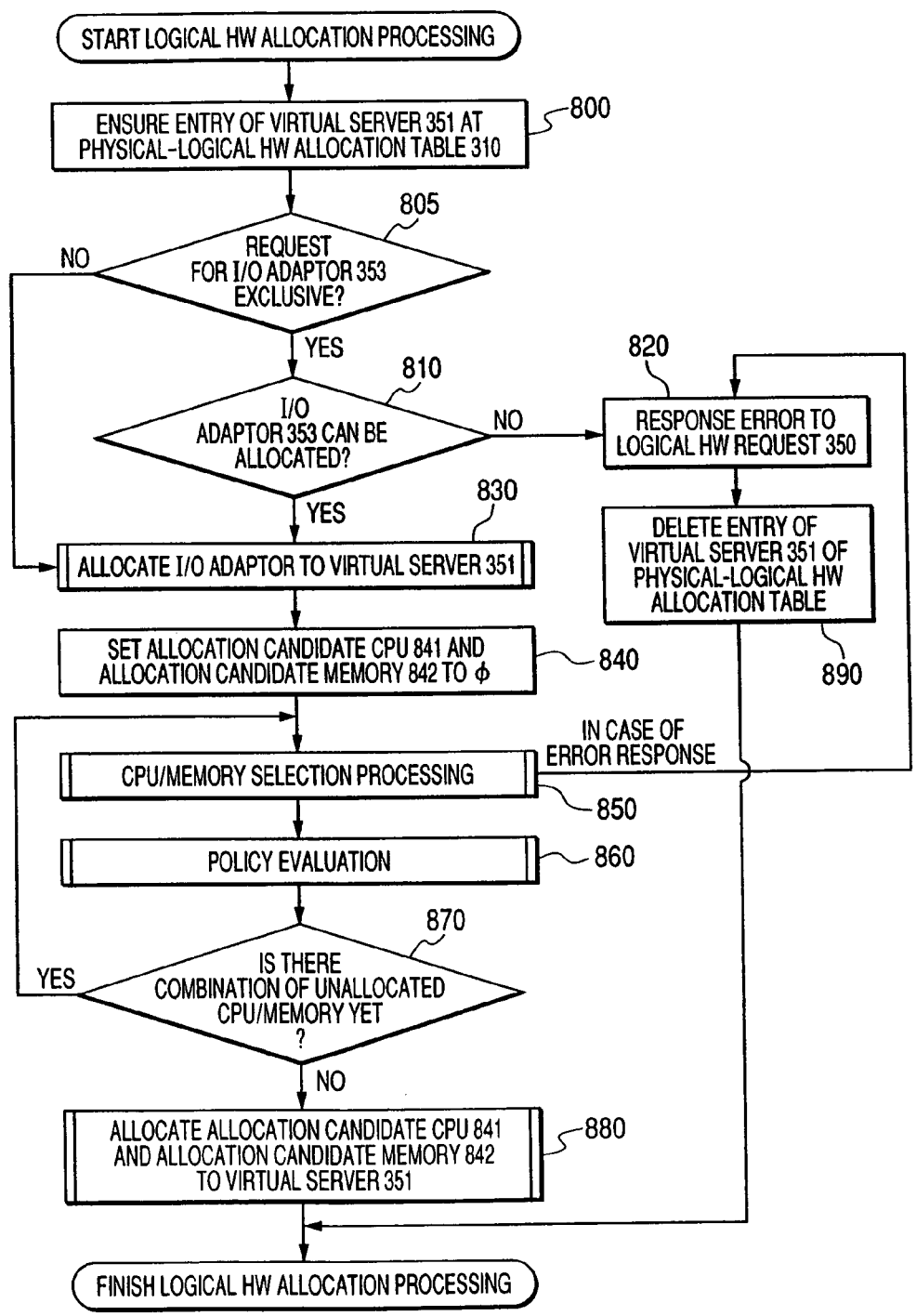
FIG. 55 is a flowchart showing an example of a logical hardware allocation processing carried out by a virtual machine monitor showing the first embodiment.

FIG. 55 shows a flowchart of a total of a logical hardware allocation processing carried out at the logical hardware allocation processing portion 801 of the virtual machine monitor 300. There is constituted a procedure of first, allocating an I/O adaptor requested by guest OS 360, further selecting and allocating unallocated CPU-memory, carrying out an evaluation in accordance with a requested policy and selecting a combination of CPU memory near to the requested policy the most.

First, the procedure proceeds to Step 800. The logical hardware allocation processing portion 801 of the virtual machine monitor 300 ensures entry of virtual server 351 in the physical-logical hardware allocation table 310. The procedure proceeds to Step 805.

At Step 805, it is determined whether the allocation request of I/O adaptor 353 requested in the logical hardware I/F 350a is exclusive or shared. When shared as a result of determination, the procedure proceeds to Step 810 and proceeds to Step 830 when shared.

At step S810, it is determined whether the requested I/O adaptor 353 is allocatable. When already allocated to other virtual server and unallocatable, the procedure proceeds to Step 820 and proceeds to Step 830 when allocatable.

Step 820 is a step of responding error to the logical hardware request I/F 350. After error response, the procedure proceeds to Step 890.

Figure 56:
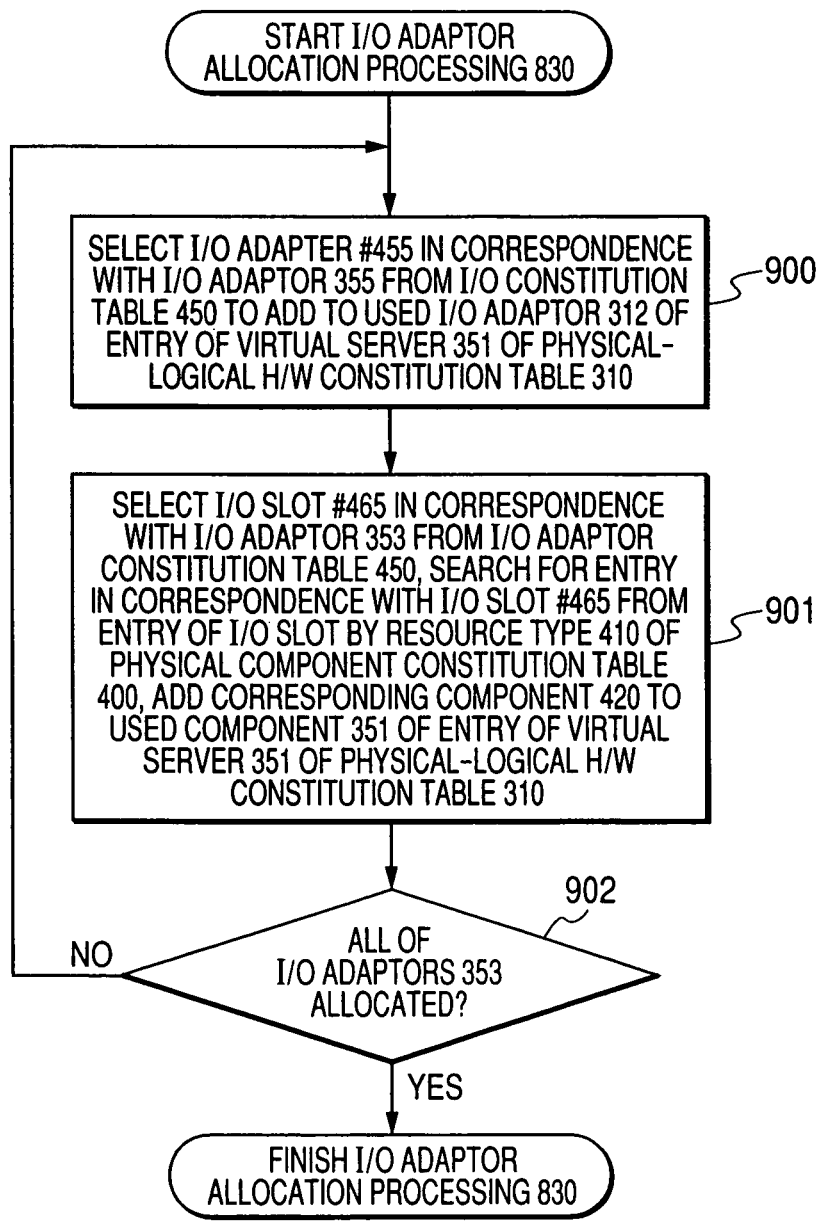
FIG. 56 is a flowchart showing a subroutine of I/O adaptor allocation processing of the same logical hardware allocation processing showing the first embodiment.

Step 830 becomes I/O adaptor allocation processing. A flow of a subroutine of the I/O adaptor allocation processing is shown in FIG. 56. After finishing the subroutine, the procedure proceeds to step S840.

Step 840 is a step of setting an allocation candidate CPU 841 and an allocation candidate memory 842 to an empty set (φ) Here, the allocation candidate CPU 841 and the allocation candidate memory 842 indicate candidates of a combination of CPU and memory near to the allocation policy the most in combinations up to the point. At the time point, CPU memory is not selected yet, and therefore, the empty set (φ) is constituted. The procedure proceeds to Step 850.

Figure 57:
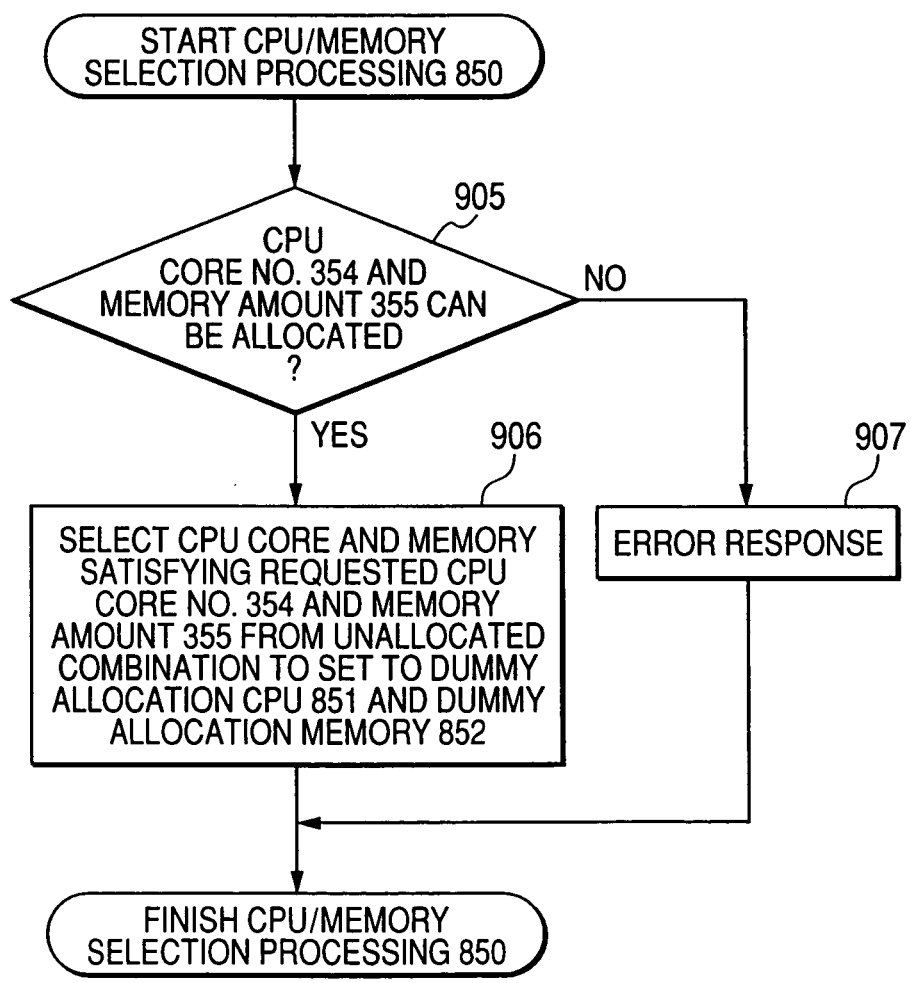
FIG. 57 is a flowchart showing CPU of the same logical hardware allocation processing and a subroutine of a memory selection processing showing the first embodiment.

Step 850 is a processing of selecting CPU memory satisfying the request from unallocated CPU memory. A flow of a subroutine of the CPU/memory selection processing 850 is shown in FIG. 57. After finishing the subroutine, when there is an error response, the procedure proceeds to Step 820. Otherwise, the procedure proceeds to Step 860.

Figure 58:
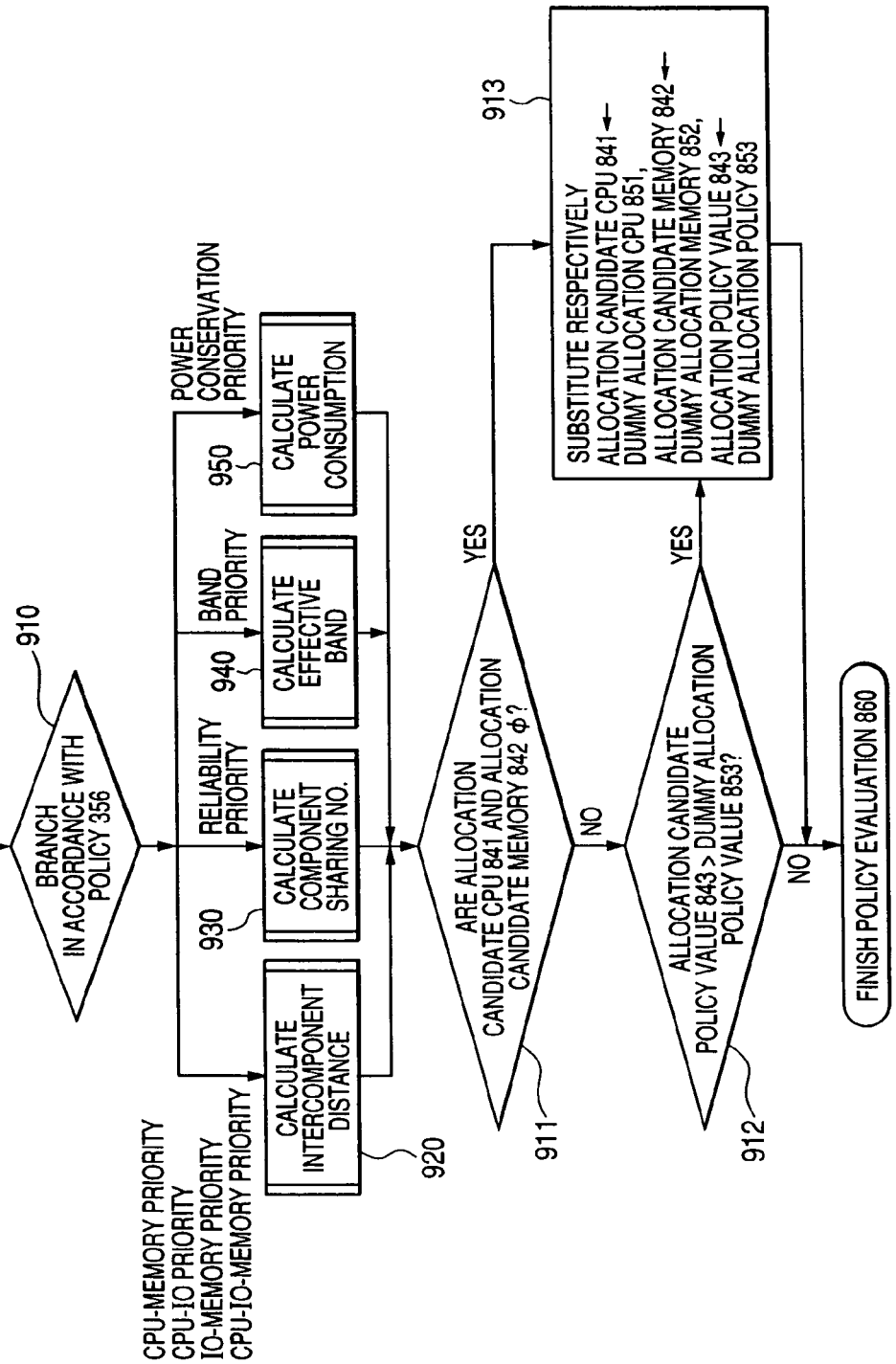
FIG. 58 is a flowchart showing a subroutine of a policy evaluation processing of the same logical hardware allocation processing showing the first embodiment.

Step 860 is a step of carrying out an evaluation in accordance with an allocation policy for CPU memory selected at Step 850. A flow of a subroutine of policy evaluation 860 is shown in FIG. 58. After finishing the subroutine, the procedure proceeds to Step 870.

Step 870 is a step of determining whether there is a combination of unallocated CPU/memory yet. When the combination remains, the procedure returns to Step 850. Otherwise, the procedure proceeds to Step 880.

Figure 63:
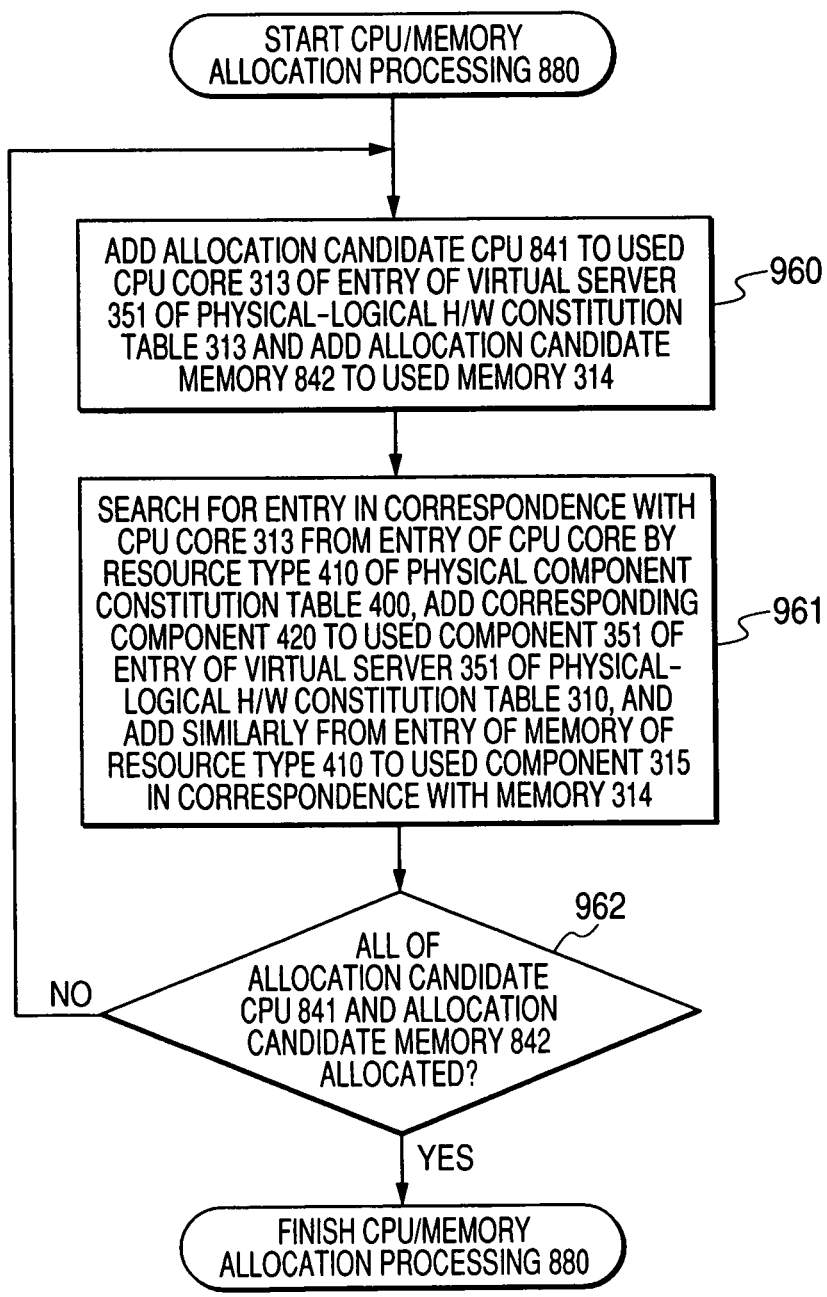
FIG. 63 is a flowchart showing CPU of the same logical hardware allocation processing and a subroutine of a memory allocation processing showing the first embodiment.

Step 880 is a processing of allocating the allocation candidate CPU 841 and the allocation candidate memory 842 to the virtual server 351 of the logical hardware allocation table 310. A flow of a subroutine of the CPU/memory allocation processing 880 is shown in FIG. 63. When the subroutine is finished, the logical hardware allocation processing is finished.

Step 890 is a step of deleting entry of the virtual server 351 of the physical-logical hardware allocation table 310 when error is constituted in the midst of allocation at Step 850 (or when a resource allocated at Step 810 is deficient). After deleting the entry, the logical hardware allocation processing is finished.

FIG. 56 shows the flow of the subroutine of the I/O adaptor allocation processing 830. First, the subroutine proceeds to Step 900.

Step 900 is a step of selecting I/O adaptor #455 in correspondence with I/O adaptor 353 of the logical hardware request I/F 350a from I/O adaptor constitution table 450 to add to used I/O adaptor 312 of entry of the virtual server 351 of the physical-logical hardware constitution table 310. The subroutine proceeds to Step 901.

Step 901 is a step of selecting I/O slot #465 in correspondence with I/O adaptor 353 from I/O adaptor constitution table 450, searching for entry in correspondence with I/O slot #465 from entry of I/O slot by resource type 410 of the physical component constitution table 400, and adding corresponding component 420 to used component 315 of entry of virtual server 351 of the physical-logical hardware constitution table 310. The subroutine proceeds to Step 902.

Step 902 is a step of determining whether all of I/O adaptors 353 are allocated. When an unallocated adaptor remains yet, the subroutine returns to Step 900. Otherwise, the I/O adaptor allocation processing 830 is finished.

FIG. 57 shows the flow of the subroutine of the CPU/memory selection processing 850. First, the subroutine proceeds to Step 905.

Step 905 is a step of determining whether CPU core NO.354 and memory amount 355 requested by the logical hardware request I/F 350a can be allocated. When unallocatable, the subroutine proceeds to Step 907. When allocatable, the subroutine proceeds to Step 906.

Step 906 is a step of selecting CPU core and memory satisfying CPU core NO.354 and memory amount 355 requested by the logical hardware request I/F 350a from an unallocated combination to set to dummy allocation CPU 151 and dummy allocation memory 852. Thereby, the CPU/memory selection processing 850 is finished.

Step 907 is a step of responding error. Thereby, the CPU/memory selection processing 850 is finished.

FIG. 58 shows the flow of the subroutine of policy evaluation 860. First, the subroutine proceeds to Step 910.

Step 910 is a step of carrying out condition branch in accordance with allocation policy 356 of the logical hardware request I/F 350a. When the allocation policy 356 is any of CPU-memory priority, CPU-I/O priority, I/O-memory priority, CPU-I/O-memory priority, the subroutine proceeds to Step 920. When the policy 356 is reliability priority, the subroutine proceeds to Step 930. When the policy 356 is band priority, the subroutine proceeds to Step 950. When the policy 35 is power conservation priority, the subroutine proceeds to Step 950.

Figure 59:
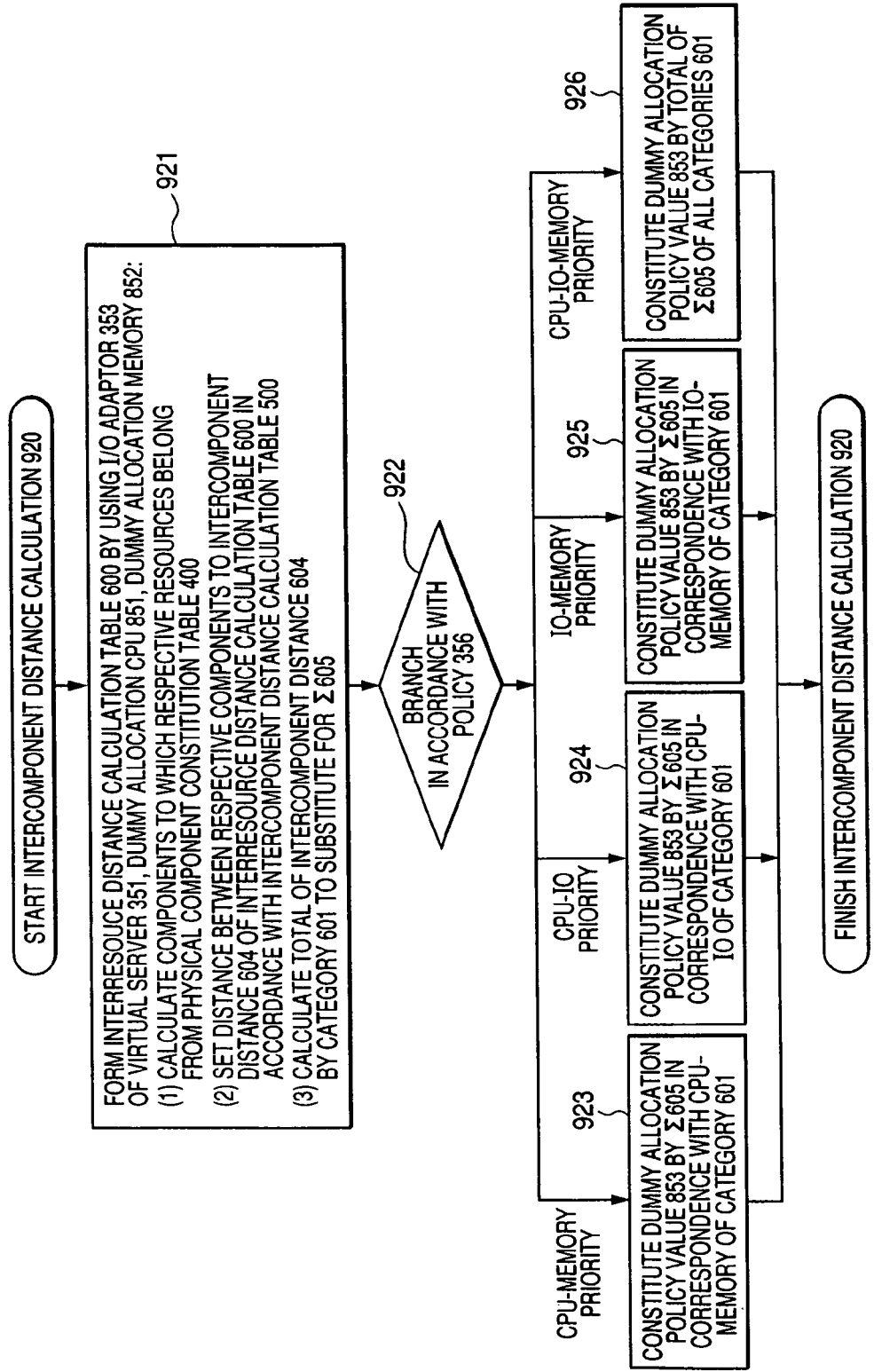
FIG. 59 is a flowchart showing a subroutine of an inter-component distance calculation processing of the same logical hardware allocation processing showing the first embodiment.

Step 920 is intercomponent distance calculation processing. FIG. 59 shows the flow of the subroutine. After finishing the subroutine, the subroutine proceeds to Step 911.

Figure 60:
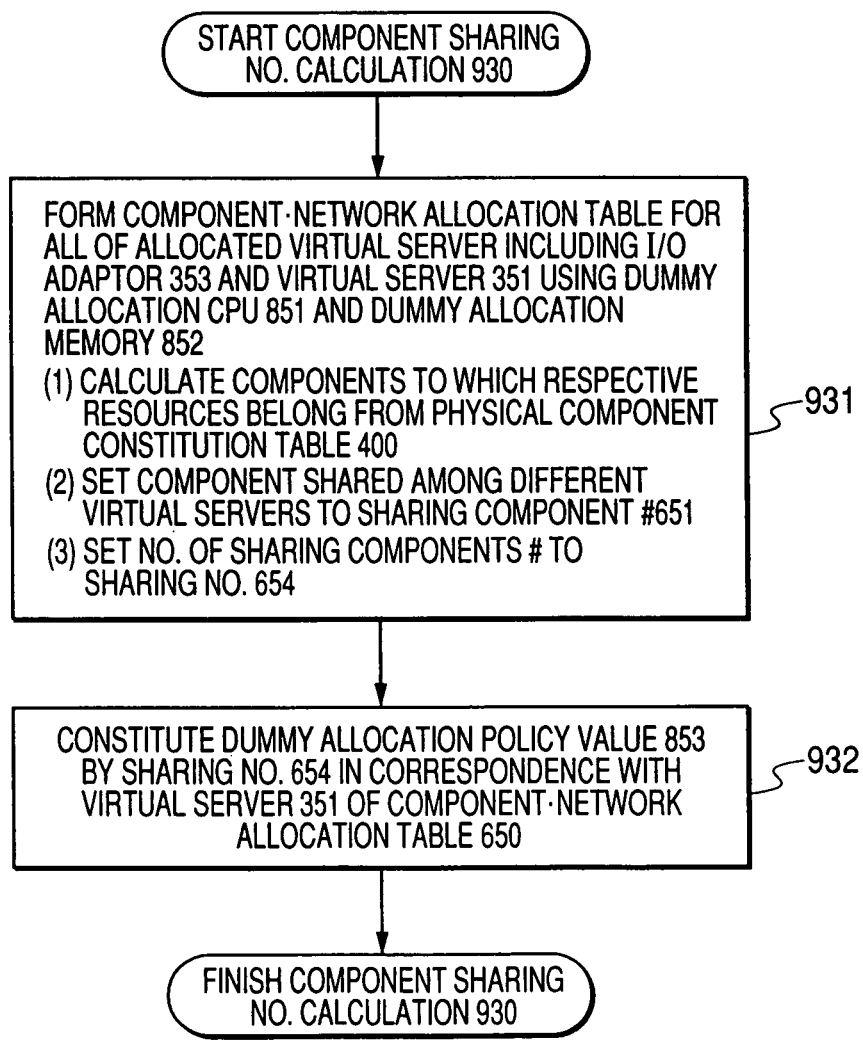
FIG. 60 is a flowchart showing a component sharing number calculation processing of the same logical hardware allocation processing showing the first embodiment.

Step 930 is a component sharing NO. calculation processing. FIG. 60 shows a flow of a subroutine. After finishing the subroutine, the subroutine proceeds to Step.911.

Figure 61:
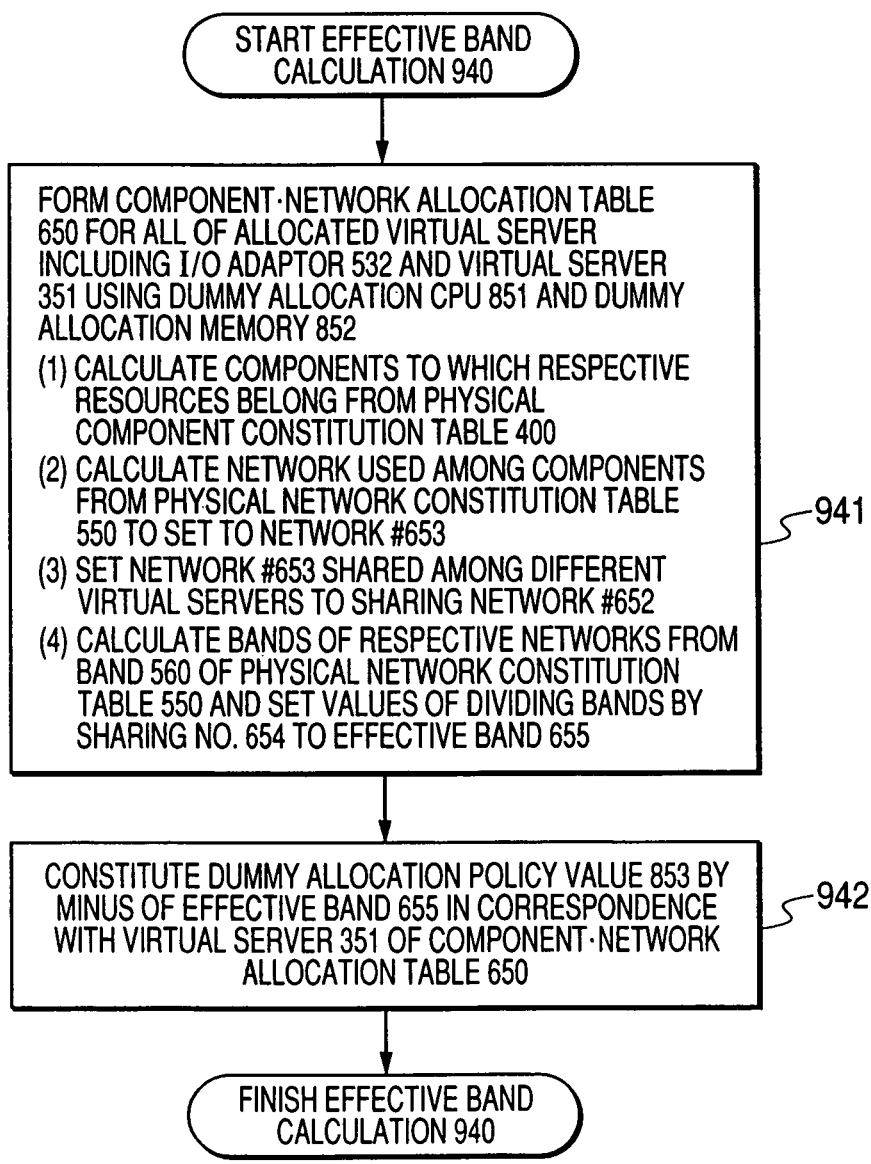
FIG. 61 is a flowchart showing a subroutine of an effective band calculation processing of the same logical hardware allocation processing showing the first embodiment.

Step 940 is effective band calculation processing. FIG. 61 shows a flow of a subroutine. After finishing the subroutine, the subroutine proceeds to Step 911.

Figure 62:
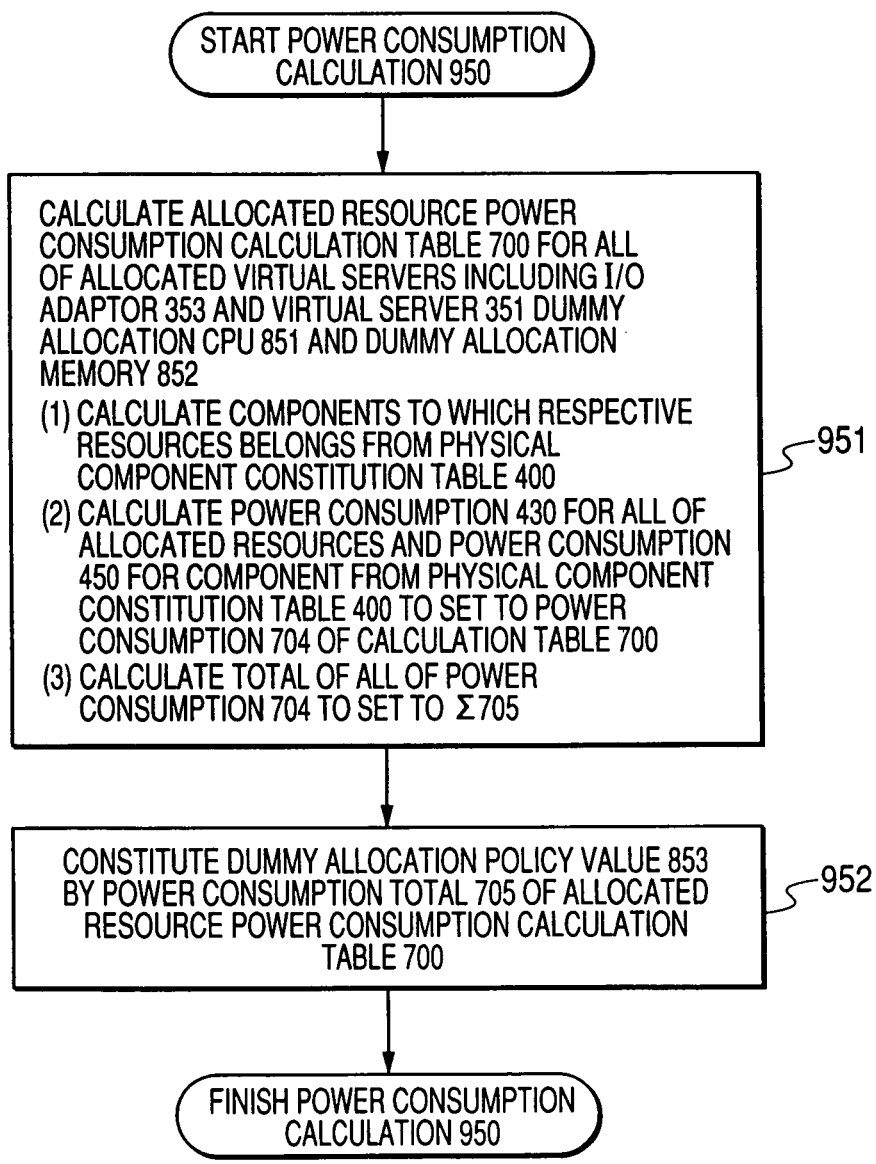
FIG. 62 is a flowchart showing a subroutine of a power consumption calculation processing of the same logical hardware allocation processing showing the first embodiment.

Step 950 is power consumption calculation processing. FIG. 62 shows a flow of a subroutine. After finishing the subroutine, the subroutine proceeds to Step 911.

Step 911 is a step of determining whether the allocation candidate CPU 841 and the allocation candidate memory 842 are the empty set ($\phi$). In a case of the empty set ($\phi$), the subroutine proceeds to Step 913. Otherwise, the subroutine proceeds to Step 912.

Step 912 is a step of determining whether dummy allocation policy value 853 is smaller than the allocation candidate policy value 843. Here, the policy value is an index for quantitatively evaluating a constitution of allocated resource-component and is defined such that the smaller the value, the nearer to the requested policy. When the dummy allocation policy value 853 is smaller than the allocation candidate policy value 843, the subroutine proceeds to Step 913. Otherwise, policy evaluation 860 is finished.

Step 913 is a step of substituting dummy allocation CPU 851, dummy allocation memory 852, dummy allocation policy value 853 respectively for allocation candidate CPU 841, allocation candidate memory 842, allocation candidate policy value 843. By the processing, a combination of CPU memory of a combination in which the policy value is the smallest in allocations up to the point is held in the allocation candidate policy value 843. By the processing, the policy evaluation 860 is finished.

Further, at Step 913 of FIG. 58, the allocation candidate policy value 843 is set in the form of succeeding the value of the dummy allocation policy value 853, at Step 912 of an initial time, an initial value of the allocation candidate policy value 843 is indeterminant, however, at the initial time, at Step 840 of FIG. 55, the allocation candidate CPU 841 and the allocation candidate memory 842 are set to $\phi$, and therefore, in the determination at Step 911, the subroutine necessarily proceeds to Step 913 and does not pass Step 912. Further, the allocation candidate policy value 843 may be initialized by a predetermined maximum value.

FIG. 59 shows the flow of the subroutine of an intercomponent distance calculation 920. First, the subroutine proceeds to Step 921.

Step 921 is a step of forming an interresource distance calculation table 600 by using the I/O adaptor 353 for virtual server 351 of the logical hardware request I/F 350a, the dummy allocation CPU 851, the dummy allocation memory 852. Specifically, constituted by processings of:

(1) calculating components to which respective resources belong from the physical component constitution table 400
(2) setting distances between respective components to intercomponent distance 604 of interresource distance calculation table 600 in accordance with intercomponent distance corresponding table 500.
(3) calculating a total of the intercomponent distance 604 by category 601 to substitute for Σ605. Next, the subroutine proceeds to step 922.

Step 922 is a step of carrying out condition branch in accordance with the allocation policy 356 of the logical hardware request I/F 350a. When the policy 356 is CPU-memory priority, the subroutine proceeds to Step 923. When the policy 356 is CPU-I/O priority, the subroutine proceeds to Step 924. When the policy 356 is I/O-memory priority, the subroutine proceeds to Step 925. When the policy 356 is CPU-I/O-memory priority, the subroutine proceeds to Step 926.

Step 923 is a step of constituting dummy allocation policy value 853 by Σ605 in correspondence with CPU-memory of the category 601 of the interresource distance calculation table 600. Thereby, the intercomponent distance calculation 920 is finished.

Step 924 is a step of constituting dummy allocation policy value 853 by Σ605 in correspondence with CPU-I/O of the category 601 of the interresource distance calculation table 600. Thereby, the intercomponent distance calculation 920 is finished.

Step 925 is a step of constituting dummy allocation policy value 853 by Σ605 in correspondence with I/O-memory of the category 601 of the interresource distance calculation table 600. Thereby, the intercomponent distance calculation 920 is finished.

Step 926 is a step of constituting dummy allocation policy value 853 by a total of Σ605 of all of categories 601 of the interresource calculation table 600. Thereby, the intercomponent distance calculation 920 is finished.

FIG. 60 shows the flow of the subroutine of the component sharing NO. calculation 930. First, the subroutine proceeds to Step 931.

Step 931 is a step of forming component network allocation table 650 for all of allocated virtual servers including I/O adaptors 353 of the logical hardware request I/F 350a, and virtual server 351 using dummy allocation CPU 851 and dummy allocation memory 852. Specifically, Step 931 is constituted by processings of:
(1) calculating components to which respective resources belong from the logical component constitution table 400
(2) setting component shared among different virtual servers to sharing component #651
(3) setting NO. of sharing component # to sharing NO.654.
The subroutine proceeds to Step 932.

Step 932 is a step of constituting dummy allocation policy value 853 by sharing NO.654 in correspondence with virtual server 351 of component network allocation table 650. Thereby, the component sharing NO. calculation is finished.

FIG. 61 shows the flow of the subroutine of the effective band calculation 940. First, the subroutine proceeds to Step 941.

Step 941 is a step of forming component network allocation table 650 for all of allocated virtual servers including I/O adaptor 353 of the logical hardware request I/F 350a, and the virtual server 351 using the dummy allocation CPU 851 and the dummy allocation memory 852. Specifically, Step 941 includes processings of:
(1) calculating components to which respective resources belong by the physical component constitution table 400.
(2) calculating network used among components from the physical network constitution table 550 to set to network #653.
(3) set network #653 shared among different virtual servers to sharing network #652.
(4) calculating bands of respective networks from the band 560 of the physical network constitution table 550 and set values of dividing bands by a sharing NO.654 to effective band 655. The subroutine proceeds to Step 942.

Step 942 is a step of constituting dummy allocation policy value 853 by minus of effective band 655 in correspondence with virtual server 351 of the component network allocation table 650. Here, the policy value 853 is defined such that the smaller the policy value 853, the nearer to the requested policy. On the other hand, the larger the absolute value of the effective band, the better. Hence, by constituting the dummy allocation policy value 853 by the value of making the value of the effective band minus, the constitution having the largest effective band is finally selected. Thereby, the effective band calculation 940 is finished.

FIG. 62 shows the flow of the subroutine of the power consumption calculation 950. First, the subroutine proceeds to Step 951.

Step 951 is a step of calculating allocation resource power consumption calculation table 700 for all of allocated virtual servers including I/O adaptor 353 of the logical hardware request I/F 350a and virtual server 351 using the dummy allocation CPU 851 and the dummy allocation memory 852. Specifically, Step 951 includes processings of:
(1) calculating components to which respective resources belong by the physical component constitution table 400.
(2) calculating power consumption for resource power consumption 430 and component for all of allocated resources from the physical component constitution table 400 to set to power consumption 704 of calculation table 700.
(3) calculating a total of all of power consumption 704 to set to Σ705. The subroutine proceeds to Step 952.

Step 952 is a step of constituting dummy allocation policy value 853 by power consumption total 705 of allocation resource power consumption calculation table 700. Thereby, the power consumption calculation 950 is finished.

FIG. 63 shows the flow of the subroutine of the CPU/memory allocation processing 880. First, the subroutine proceeds to Step 960.

Step 960 is a step of adding allocation candidate CPU 841 to used CPU core 313 of entry of dummy server 351 of the physical-logical hardware constitution table 310 and adding the allocation candidate memory 842 to used memory 314. The subroutine proceeds to Step 961.

Step 961 is a step of searching for entry in correspondence with CPU core 31 from entry of CPU core by resource type 410 of the physical component constitution table 400, adding corresponding component 420 to used component 315 of entry of virtual server 351 of the physical-logical hardware constitution table 310, and adding from entry of memory to used component 315 of entry in correspondence with the memory 314 by the resource type 410. The subroutine proceeds to Step 961.

Step 962 is a step of determining whether all of allocation candidate CPU 841 and allocation candidate memory 842 are allocated. When unallocated allocation candidate CPU 841 or allocation candidate memory 842 remains yet, the subroutine returns to Step 960. Otherwise, the CPU/memory allocation processing 840 is finished.

By the above-described series of operation, virtual machine monitor 300 can form the physical-logical hardware allocation table 310 from the logical hardware request I/F 350 instructed from the console 230.

As described above, according to the first embodiment, the virtual machine monitor 300 acquires distances among components indicating physical position information of components in the multiprocessor system 100, previously sets the intercomponent corresponding table 500 and previously sets the physical component constitution table 400 and the I/O adaptor constitution table 450 and the physical network constitution table by acquiring the constitution of the physical network and power consumption of respective resources. Further, virtual machine monitor 300 receives the logical hardware request I/O 350 constituting a request of forming (or setting) virtual server from the console 230, first, selects the requested I/O adaptor 180, and carries out exclusive allocation of the I/O adaptor 180 to the requested virtual server. Next, virtual machine monitor 300 can provide the virtual server optimum for the requested policy by selecting CPU and memory satisfying the requested policy to allocate to the virtual server from the I/O device carrying out the exclusive allocation by referring to physical position information or power consumption of resources from the intercomponent distance corresponding table 500 and the physical component constitution table 400 for the virtual server.

Particularly, when a plurality of virtual servers (guest OS) are operated by one physical computer, even when the policy differs for respective virtual servers, constitution optimum for respective virtual servers can automatically be allocated from physical position information of I/O device, CPU socket, memory and usability of virtual computer can be promoted.
<Second Embodiment> (Logical Hardware Constitution Notice I/F)

A second embodiment of the invention will be shown by FIG. 43 through FIG. 48. Further, the constitution of the multiprocessor system 100 of the second embodiment is similar to that of the first embodiment.

FIG. 43 shows logical hardware request I/F 350$k$ of virtual server 1_370$a$. In the logical hardware request I/F 350$k$, 4 of CPU cores and memory of 8 GB, 180$d$ and 180$f$ as I/O adaptors are requested.

Figure 45:
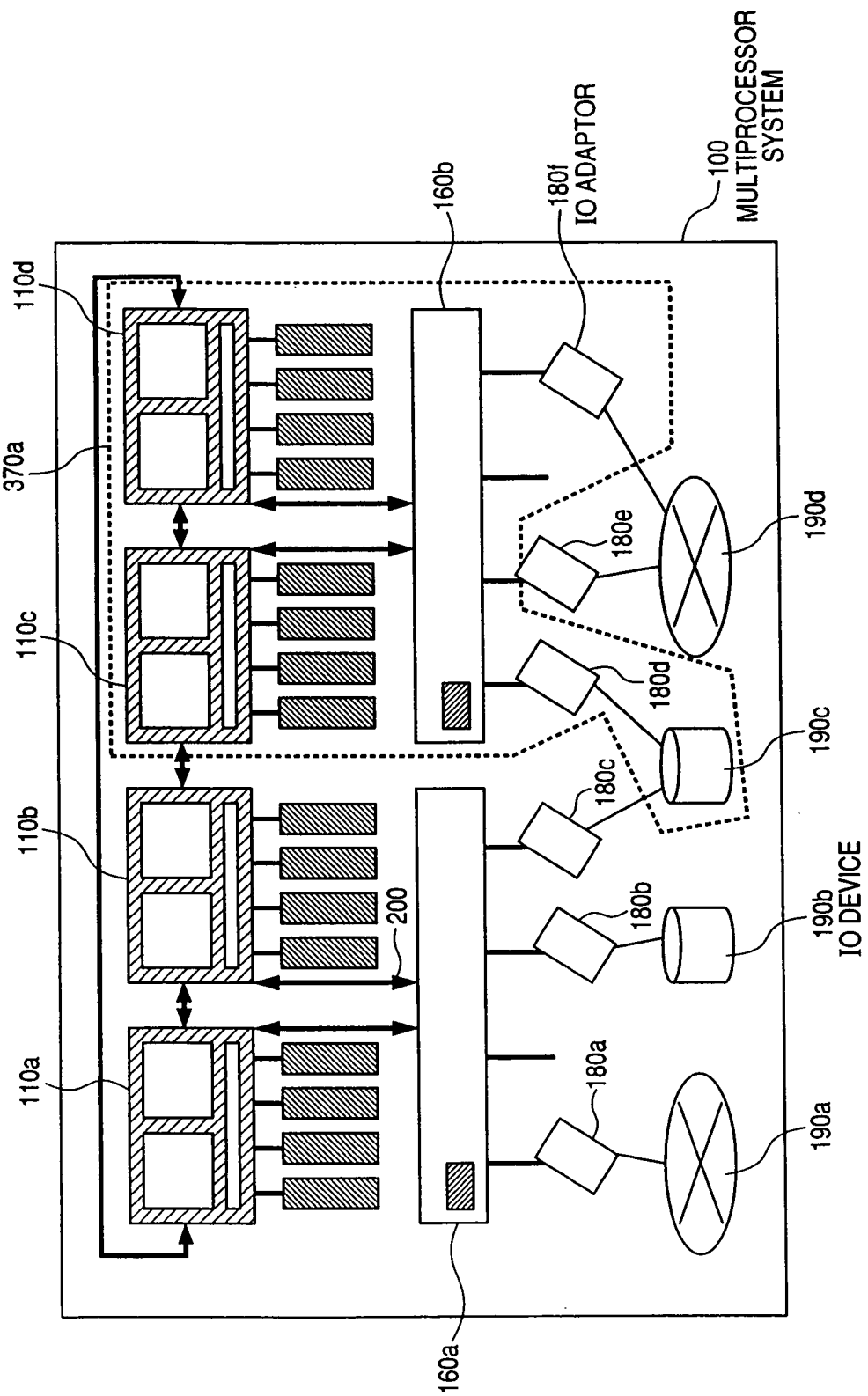
FIG. 45 is a block diagram showing a constitution of the virtual server 1 on a multiprocessor system showing the second embodiment.

FIG. 44 shows physical-logical hardware allocation table 310$k$ in correspondence with the logical hardware request I/F 350$k$ of FIG. 23. FIG. 45 shows an arrangement of virtual server 1_370$a$ allocated on the multiprocessor system 100 of FIG. 1. A portion of the drawing surrounded by a dotted line is virtual server 1_370$a$.

Here, consider operation of guest OS1_360$a$ on virtual server 1_370$a$. Assume that guest OS1_360$a$ is OS on the multiprocessor system 100, which is provided with a function of Affinity control with regard to CPU and memory in conformity with ACPI mentioned above. By the function of Affinity control, the function is promoted by shortening latency of access of from CPU core to memory by allocating CPU cores #4, 5 and DIMM #8, 9, 10, 11 on CPU socket 110$c$, or allocating CPU cores #6, 7 on CPU socket 110$d$ and DIMM #12, 13, 14, 15 to an application on guest OS 360. However, in order to use the function of the Affinity control, it is necessary for guest OS1_350$a$ to know an arrangement of a hardware of virtual server 1. Therefore, constitution information notice I/F (logical hardware constitution information notice I/F 340) from virtual machine monitor 300 to guest OS 360 is needed.

FIG. 46 shows logical hardware constitution information 750 present on virtual machine monitor 300. This is information secondarily formed from the physical-logical hardware allocation table 310, which is constituted by host CPU core #751 indicating identification data or consecutive NO. of CPU core 120, host physical address base 752 indicating start point of physical address of allocated memory 150, and host physical address range 753 indicating an amount of allocated memory 150. However, even when the information is noticed to guest OS1_360$a$ as it is, guest OS1_360$a$ cannot carry out Affinity control correctly. Because host physical address base on the multiprocessor system 100 allocated by virtual machine monitor 300 at guest OS360$a$ and guest physical address base of guest OS1_360$a$ differ from each other.

Figure 48:
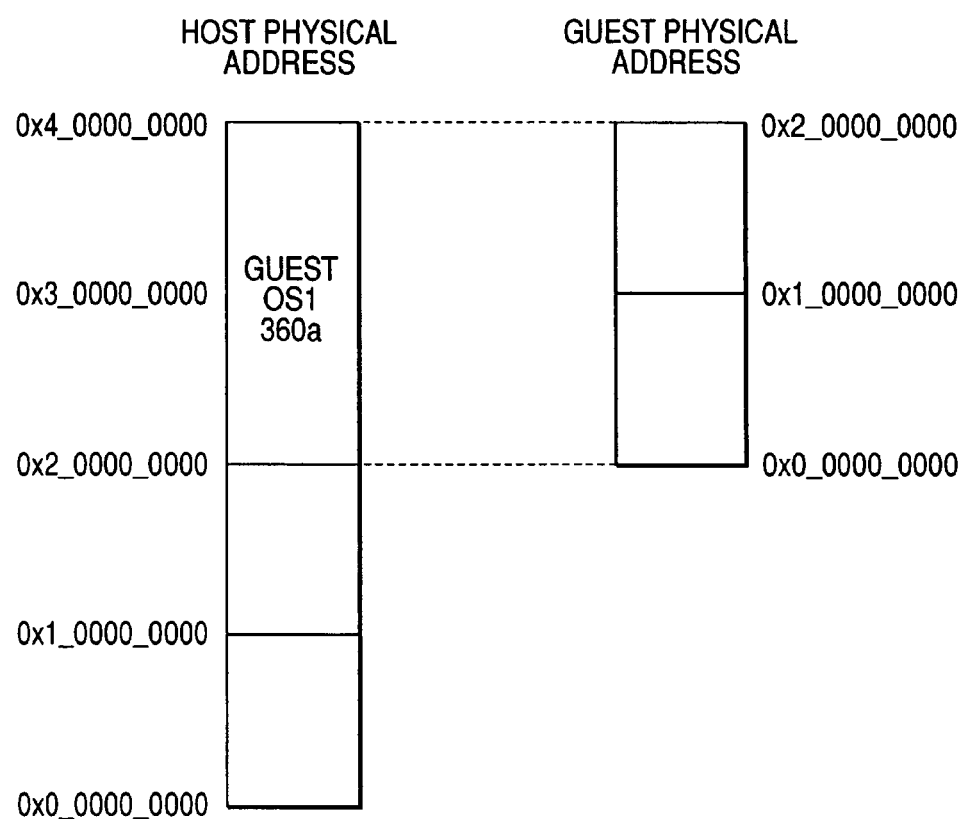
FIG. 48 is a map showing a relationship between a host physical address and a guest physical address showing the second embodiment.

FIG. 48 shows a relationship of host physical address space and guest physical address space. When guest OS1_360$a$ is allocated to host physical address base of 0×2_0000_0000, a shift of address is brought about such that 0×0_0000_0000 of guest physical address corresponds to host physical address of 0×2_0000_0000. Therefore, when logical hardware constitution information is noticed to guest OS1_360$a$, the notice needs to be carried out in consideration of the shift.

FIG. 47 shows logical hardware constitution information notice I/F 340 from virtual machine monitor 300 to guest OS1_360$a$. The logical hardware constitution information notice I/F 340 is constituted by guest CPU core #341 indicating identification data or consecutive NO. of allocated CPU core 120, guest physical address base 342 indicating base address allocated to guest OS 360, guest physical address range indicating address range allocated to guest OS 360. In FIG. 47, guest CPU core #341 carries out reattachment successively from 0. The guest physical address base 342 is constituted by a value of subtracting base address 0×2_0000_0000 of virtual server 1_370$a$. Assume that the guest physical address range 343 is constituted by a value the same as that of the host physical address range 753. By the above-described, used logical hardware constitution information which can be utilized for Affinity control in conformity with ACPI by guest OS1_360$a$ is formed. Virtual machine monitor 300 forms the logical hardware constitution information notice I/F 340 to notice to guest OS 360. Further, although here, only a set of address range of CPU #341 and memory is noticed, higher degree information (including also information of distance of, for example, interresouce distance calculation table 600) can be noticed. Also in this case, a rule of converting the host physical address to the guest physical address remains unchanged.

As described above, according to the second embodiment of the invention, function or reliability equivalent to that of the physical server can be ensured by correctly operating Affinity control of guest OS 360 by enabling to correctly utilize physical position information of used component by acquiring logical hardware constitution information notice I/F 340 formed by virtual machine monitor 300 by guest OS 360 on virtual server by allocating pertinent resource to virtual server by virtual machine monitor 300.

<Third Embodiment> (Reallocation of Resource)

A third embodiment of the invention will be explained in reference to FIG. 43 through FIG. 45 and FIG. 49 through FIG. 54. A result of allocating virtual server 1_370$a$ as in the physical-logical hardware allocation table 310$k$ shown in FIG. 44 by virtual machine monitor 300 in accordance with the logical hardware request I/F 350$k$ similar to the second embodiment is shown in FIG. 45.

Assume that in a state of allocating virtual server 1_370$a$ as shown by FIG. 45, logical hardware request I/F 350$m$ with regard to virtual server 2 shown in FIG. 49 is inputted from the console 230 to virtual machine monitor 300. In the logical hardware request I/F 350$m$ of FIG. 49, priority 357 is constituted by 10, which is a value larger than priority 5 of logical hardware request I/F 350$k$ of virtual server 1. In this case, it is requested for virtual machine monitor 300 to rearrange resource already allocated to virtual server 1 to satisfy resource allocation policy of virtual server 2 having higher priority.

FIG. 50 shows physical-logical hardware allocation table 310$m$ when virtual machine monitor 300 allocates resource to virtual server 2_370$b$ by making resource allocated to virtual server 1_370$a$ as it is. Further, FIG. 51 shows physical-logical hardware allocation table 310$n$ when allocated resource is temporarily removed from virtual server 1_370$a$, allocating resource to virtual server 2_370$b$, thereafter, resource is reallocated to virtual server 1_370$a$. Further, FIG. 52 shows interresource distance calculation table 600$m$ calculated in accordance with physical-logical hardware allocation table 310$n$ of FIG. 50, FIG. 53 shows interresource distance calculation table 600$n$ calculated in accordance with physical-logical hardware allocation table 310$n$ of FIG. 51.

Figure 54:
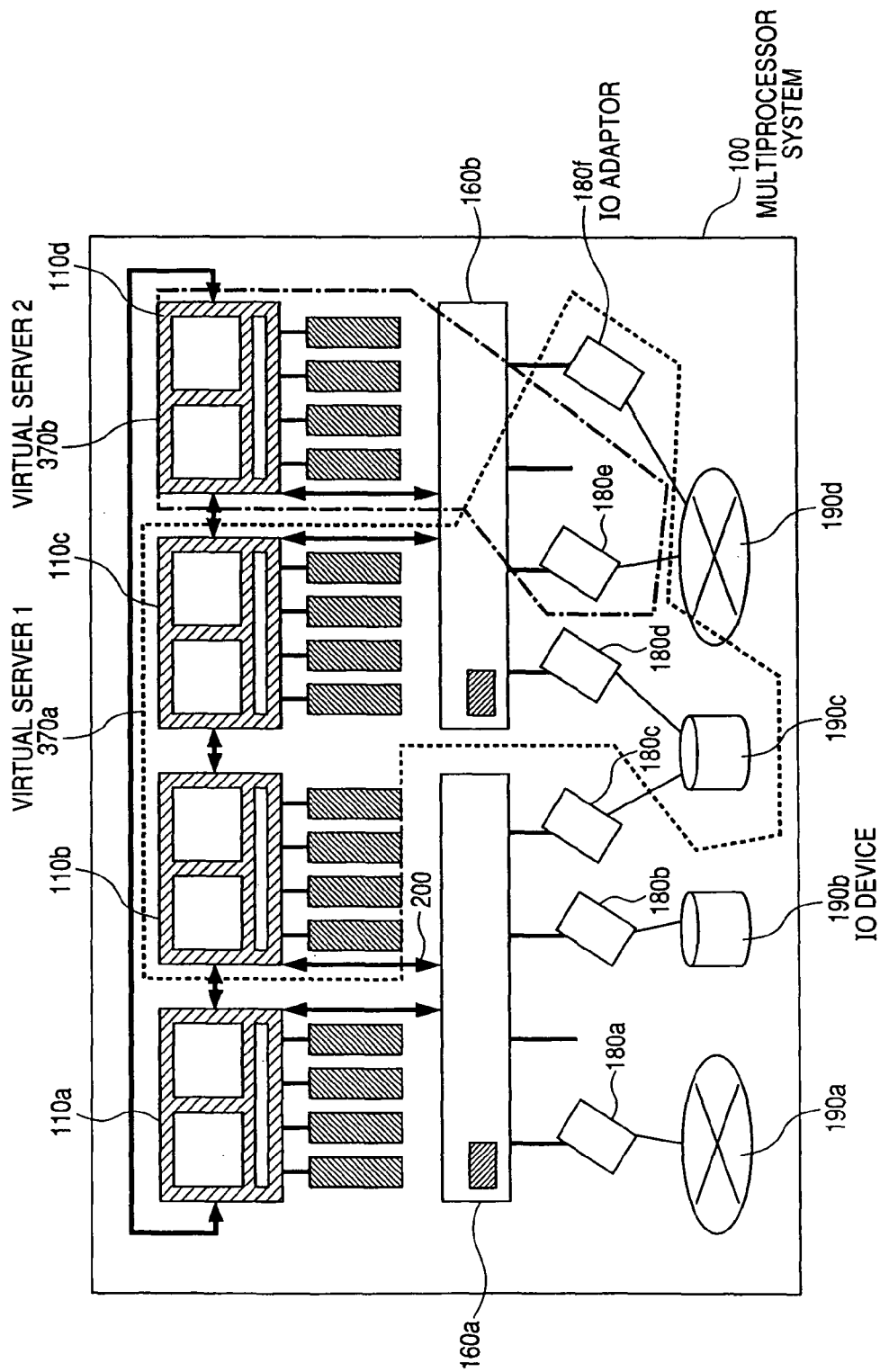
FIG. 54 is a block diagram showing the virtual servers 1 and 2 on a multiprocessor system showing the second embodiment.

Resource allocation policy 356 of the logical hardware request I/F 350$n$ of FIG. 49 is constituted by "I/O-memory priority", when total sum 605 of intercomponent distance of "I/O-memory" of interresource distance calculation table 600 is compared, whereas the total sum is 2 in calculation table 600$m$ of FIG. 52, total sum is 1 in calculation table 600$n$ of FIG. 53, and it is known that by rearranging resource, an arrangement satisfying resource allocation policy of virtual server 2 further can be carried out. FIG. 54 shows a behavior of allocating virtual server 1_370a and virtual server 2_370b on multiprocessor system 100 by virtual machine monitor 300 in accordance with the physical-logical hardware allocation table 310n.

In this way, when there are a plurality of logical hardware requests having different priorities, by allocating resource successively from the logical hardware request I/F 350 having higher priority, resource can predominantly be allocated to request having higher priority. However, when resource is rearranged, there is a case in which CPU and memory need to move. With regard to movement of CPU, copy, cash of content of register, or flash of TLB or the like is needed, further, with regard to movement of memory, copy of memory is needed. A publicly-known or a well-known method may be applied to a specific method of moving CPU or memory.

As described above, according to the third embodiment of the invention, in newly allocating virtual server to the multiprocessor system 100, a further optimum virtual server can be constituted by reallocating resource in an order of higher priority of virtual server by temporarily releasing the already allocated resource.

As described above, the invention is applicable to a computer system constituted by a plurality of processors or I/F device and divided into a plurality of virtual servers and virtual machine monitor thereof.

What is claimed is:

1. A virtual machine monitor for operating a virtual server on an information-processing system connecting one or more processors, one or more memories, and one or more I/O devices by an internal network, the virtual machine monitor comprising:
   a physical hardware information acquiring portion for acquiring information describing hardware including physical position information of the hardware including the one or more processors, the one or more memories, the one or more I/O devices, and the internal network of the information-processing system;
   a receiving portion for receiving a forming request for forming the virtual server, the forming request including a number of the one or more processors for the virtual server to be formed, an amount of the one or more memories, and an allocation policy for allocating at least one of the one or more I/O devices and specifying a resource policy; and
   an allocation processing portion for allocating at least one of the one or more processors and at least one of the one or more memories to the virtual server to satisfy the allocation policy after allocating the at least one I/O device to the virtual server based on the received forming request.

2. The virtual machine monitor according to claim 1, further comprising:
   a notifying portion for notifying the physical position information of the at least one processor, the at least one memory, and the at least one I/O device allocated to the virtual server to the virtual server.

3. The virtual machine monitor according to claim 1, wherein the receiving portion receives a second forming request for forming a second virtual server; and
   wherein the allocation processing portion preserves the physical position information of the at least one processor, the at least one memory, and the at least one I/O device already allocated to the virtual server, allocates at least one of the one or more I/O devices, at least one of the one or more processors, and at least one of the one or more memories which can be utilized to the second virtual server based on the position information of the one or more processors, the one or more memories, and the one or more I/O devices which can be allocated on the information-processing system according to information of a number of the one or more processors, an amount of the one or more memories, and at least one of the one or more I/O devices specified in the second forming request for the second virtual server and the allocation policy, and rearranges the at least one processor and the at least one memory of the virtual server based on the resource policy of the allocation policy of the virtual server which is allocated.

4. The virtual machine monitor according to claim 1, wherein the physical hardware information acquiring portion calculates distances between each of the one or more processors and each of the one or more memories, and between each of the one or more processors and each of the one or more I/O devices from the physical information of the hardware; and
   wherein the allocation processing portion allocates the at least one processor, the at least one memory, and the at least one I/O device to the virtual server such that a total sum of distances between the at least one processor and the at least one memory, and between the at least one processor and the at least one I/O device is minimized based on the resource policy of the allocation policy.

5. The virtual machine monitor according to claim 1, wherein the allocation processing portion allocates one of the one or more I/O devices to the virtual server.

6. An information-processing system for connecting one or more processors, one or more memories, and one or more I/O devices by an internal network, the information processing system comprising:
   a virtual machine monitor for allocating the one or more processors, the one or more memories, the one or more I/O devices to a virtual server; and
   wherein the virtual machine monitor includes:
   a physical hardware information acquiring portion for acquiring configuration information of a hardware including physical position information of the hardware including the one or more processors, the one or more memories, the one or more I/O devices, and the internal network of the information-processing system;
   a receiving portion for receiving a forming request for forming the virtual server, the forming request including a number of the one or more processors, an amount of the one or more memories, and at least one of the one or more I/O devices for the virtual server to be formed and an allocation policy; and
   an allocation processing portion for allocating at least one of the one or more processors and at least one of the one or more memories to the virtual server to satisfy the allocation policy after allocating the at least one I/O device to the virtual server based on the received forming request.

7. The information-processing system according to claim 6, wherein the physical hardware information acquiring portion calculates distances between each of the one or more processors and each of the one or more memories, and between each of the one or more processors and each of the one or more I/O devices from the physical information of the hardware; and
   wherein the allocation processing portion allocates the at least one processor, the at least one memory, and the at least one I/O device to the virtual server such that a total sum of distances between the at least one processor and the at least one memory is minimized when the allocation policy gives a priority to an access to the at least one memory and the at least one processor.

8. The information-processing system according to claim 6, wherein the physical hardware information acquiring portion calculates distances between each of the one or more processors and each of the one or more memories, and between each of the one or more processors and each of the one or more I/O devices from the physical information of the hardware; and wherein the allocation processing portion allocates the at least one processor, the at least one memory, and the at least one I/O device to the virtual server such that a total sum of distances between the at least one processor and the at least one I/O device is minimized when the allocation policy gives a priority to an access to the at least one processor and the at least one I/O device.

9. The information-processing system according to claim 6, wherein the physical hardware information acquiring portion calculates distances between each of the one or more processors and each of the one or more memories, and between each of the one or more processors and each of the one or more I/O devices from the physical information of the hardware; and wherein the allocation processing portion allocates the at least one processor, the at least one memory, and the at least one I/O device to the virtual server such that a total sum of distances between the at least one memory and the at least one I/O device is minimized when the allocation policy gives a priority to an access to the at least one memory and the at least one I/O device.

10. The information-processing system according to claim 6, wherein the physical hardware information acquiring portion calculates distances between each of the one or more processors and each of the one or more memories, and between each of the one or more processors and each of the one or more I/O devices from the physical information of the hardware; and wherein the allocation processing portion allocates the at least one processor, the at least one memory, and the at least one I/O device to the virtual server such that a total sum of distances between the at least one processor and the at least one memory, and between the at least one processor and the at least one I/O device is minimized when the allocation policy ensures a function of a total of the virtual server.

11. The information-processing system according to claim 6, wherein the physical hardware information acquiring portion calculates a path of the internal network connecting the one or more processors, the one or more memories, the one or more I/O devices from the physical position information of the hardware; and wherein the allocation processing portion allocates at least one of the one or more processors, at least one of the one or more memories, and at least one of the one or more I/O devices to a new virtual server for which a second forming request is received based on a part of the internal network used by the already allocated virtual server and a part of the internal network to be used by the new virtual server such that a total amount of overlap between the parts of the internal network used by the already allocated virtual server and the new virtual server is minimized when the allocation policy gives a priority to a reliability of the virtual server.

12. The information-processing system according to claim 6, wherein the physical hardware information acquiring portion calculates a path of the internal network connecting the one or more processors, the one or more memories, the one or more I/O devices from the physical position information of the hardware; and wherein the allocation processing portion allocates at least one of the one or more processors, at least one of the one or more memories, and at least one of the one or more I/O devices to a new virtual server for which a second forming request is received based on a part of the internal network used by the already allocated virtual server and a part of the internal network to be used by the new virtual server such that an effective band is constituted by a value of dividing a band of the internal network used by both the already allocated virtual server and the new virtual server by a number of the virtual servers and the effective band is maximized when the allocation policy gives a priority to the band of the internal network.

13. The information-processing system according to claim 6, wherein the physical hardware information acquiring portion respectively calculates power consumptions of the one or more processors, the one or more memories, the one or more I/O devices, and a component for operating the hardware; and wherein the allocation processing portion allocates at least one of the one or more processors, at least one of the one or more memories, and at least one of the one or more I/O devices to a new virtual server for which a second forming request is received such that a total sum of power consumptions of the at least one processor, the at least one memory, the at least one I/O device, and the component for the already allocated virtual server and power consumptions of the at least one processor, the at least one memory, and the at least one I/O device, and the component for the new virtual server is minimized when the allocation policy gives a priority to power consumption.

14. The information-processing system according to claim 6, wherein the virtual machine monitor further includes:
a notifying portion for notifying the physical position information of the at least one processor, the at least one memory, and the at least one I/O device allocated to the virtual server to the virtual server.

15. The information-processing system according to claim 14, wherein the notifying portion converts the physical position information into physical position information in conformity with ACPI (Advanced Configuration and Power Interface) to provide notification to the virtual server.

16. The information-processing system according to claim 6, wherein the receiving portion receives a second forming request for forming a second virtual server; and wherein the allocation processing portion preserves the physical position information of the at least one processor, the at least one memory, and the at least one I/O device already allocated to the virtual server, allocates at least one of the one or more I/O devices, at least one of the one or more processors, and at least one of the one or more memories which can be utilized to the second virtual server based on the position information of the one or more processors, the one or more memories, and the one or more I/O devices which can be allocated on the information-processing system according to information of a number of the one or more processors, an amount of the one or more memories, at least one of the one or more I/O devices, and a second allocation policy specified in the second forming request for the second virtual server, and rearranges the at least one processor and the at least one memory of the virtual server based on the allocation policy of the virtual server which is allocated.

17. The information-processing system according to claim 6, wherein the allocation processing portion allocates one of the one or more I/O devices to the virtual server.

\* \* \* \* \*